United States Patent [19]

Pooley

[11] 4,032,897
[45] June 28, 1977

[54] INTERACTIVE AUDIOVISUAL DISPLAY SYSTEM

[75] Inventor: Charles K. Pooley, Van Nuys, Calif.

[73] Assignee: National Board of Medical Examiners, Philadelphia, Pa.

[22] Filed: Nov. 18, 1975

[21] Appl. No.: 632,976

[52] U.S. Cl. .................................. 364/900; 360/72
[51] Int. Cl.² ................... G06F 1/00; G11B 15/18
[58] Field of Search ............... 340/172.5; 360/72; 178/6.6 FS; 353/25; 35/9 A

[56] References Cited

UNITED STATES PATENTS

| | | | |
|---|---|---|---|
| 3,141,243 | 7/1964 | Chapman et al. | 35/9 |
| 3,514,537 | 5/1970 | Uemura | 360/72 |
| 3,728,685 | 4/1973 | Stalnert | 340/172.5 |
| 3,851,116 | 11/1974 | Cannon | 360/72 |
| 3,921,220 | 11/1975 | Primosch et al. | 360/72 |

Primary Examiner—Raulfe B. Zache
Attorney, Agent, or Firm—Paul & Paul

[57] ABSTRACT

In a fully flexible interactive program, options are presented to the user by means of a projected slide. When one option is selected, and is entered into the machine, a preconditioned memory energizes a servomechanism to advance a select one of plural videotape recorders to a particular segment. The servo controls the tape advance by comparing distance to go with a signal proportional to the square of the tape velocity. When the segment is reached, the videotape presents an audiovisual segment to the user, during which time information for subsequent options to be presented is coupled into the system, including identification of the next option slide to be presented and video segment identification corresponding to those options for preconditioning the memory.

21 Claims, 13 Drawing Figures

INTERACTIVE AUDIOVISUAL DISPLAY SYSTEM

BACKGROUND OF THE INVENTION

This invention relates to audiovisual display systems, and more particularly to fully interactive audiovisual systems useful for tutorial, testing, and a variety of other applications.

The prior art in the area of audiovisual display systems is quite extensive, and includes an impressive number of alternative aproaches, both in terms of ultimate function and in terms of realization of that end. For example, some machines are directed to testing, evaluation, and monitoring of various decision and performance skills, whereas others are directed to guiding students through programmed learning routines. Likewise, some systems are extremely complex in their logical execution and display apparatus, whereas others include rather limited and unsophisticated mechanical controls or rudimentary audio or visual presentation means. In accordance with applicant's understanding, however, none of the prior art is totally satisfactory from the standpoint of all important structural, functional, and cost considerations.

It is a primary object of the present invention to provide interactive audiovisual display apparatus which as nearly as possible satisfies all of the various requirements desirable for such systems. These general re-quirements and objects of the present invention include: provision for a high degree of realism and fidelity; flexibility in preparation and programming; ease of updating and modification of testing and learning programs; ease of operation by relatively unsophisticated users; technical, mechanical, and electronic reliability; computer management capability; physical portability; and acceptable operation rates.

While at first blush these requirements appear relatively unconflicting and therefore easy to realize, more detailed consideration shows them to be otherwise. For example, ultimate clarity of presentation requires facility for audio, moving picture video (e.g., film or videotape), and still video (e.g., slides). At the same time flexibility in preparation must take into account the possibility of multiple branching interactive programs, with plural options or decisions at every stage thereof. Indeed, it is not unreasonable to require a system to have a capability of handling three hundred individual interactions per program, with video segments running variously between 5 and 30 seconds each, and as many as 6 or 7 user options per interaction. Yet, for the system to be at all workable, access time for each decision must be reasonably short, and continuity for the user must be maintained reasonably throughout the program.

While these requirements most probably can be handled with reasonable facility by multipurpose digital computers with sophisticated, appropriately designed software systems, the economic and physical size considerations thereof prove entirely unworkable. Thus, design considerations for a truly useful system involve tender compromises between access time, programming flexibility, and unavoidable physical and economic realities. Embodiments of the present invention are intended to meet those requirements, and to fulfill them in a fashion superior to that accomplished in accordance with the prior art.

SUMMARY OF THE INVENTION

The present invention involves a fully interactive audiovisual display system, useful for both tutorial and testing purposes, which provides virtually unlimited branching possibilities for the program involved, while being limited to very reasonable access times. Embodiments of the present invention feature audio, moving picture video, and still video display possiblities, with keyboard option selection for the user. Advantageously, magnetic videotape recorders are utilized, with moving picture video and audio being recorded thereon. Options are presented the user preferably by means of a slide, and the apparatus is preconditioned to advance the tape to a particular segment depending which option is selected by the user. When selection is made, a servo mechanism actuates the proper tape player to advance in the proper direction, and compares the distance to go with a signal proportional to the square of the instantaneous tape speed. When the quantities are equal, deceleration begins, and during deceleration, the distance and velocity squared quantities are continuously compared, and deceleration is varied accordingly. The tape machine therefore arrives precisely at the commencement of the proper segment and switches into operation at the play speed. During presentation of the audiovisual tape segment, coded information is coupled to the machine for presenting the next subsequent option slide and control information for the videotape recorders based on whichever option will be selected.

In preferred embodiments, the option slides are projected utilizing a random access slide projector with each option slide having an individual code representation. The cue track of the videotape for each segment had encoded information thereon including the identification of the next option slide for presentation, and sufficient information to direct the machine for subsequent operation once the user has selected a given option.

DETAILED DESCRIPTION

Figure 1:
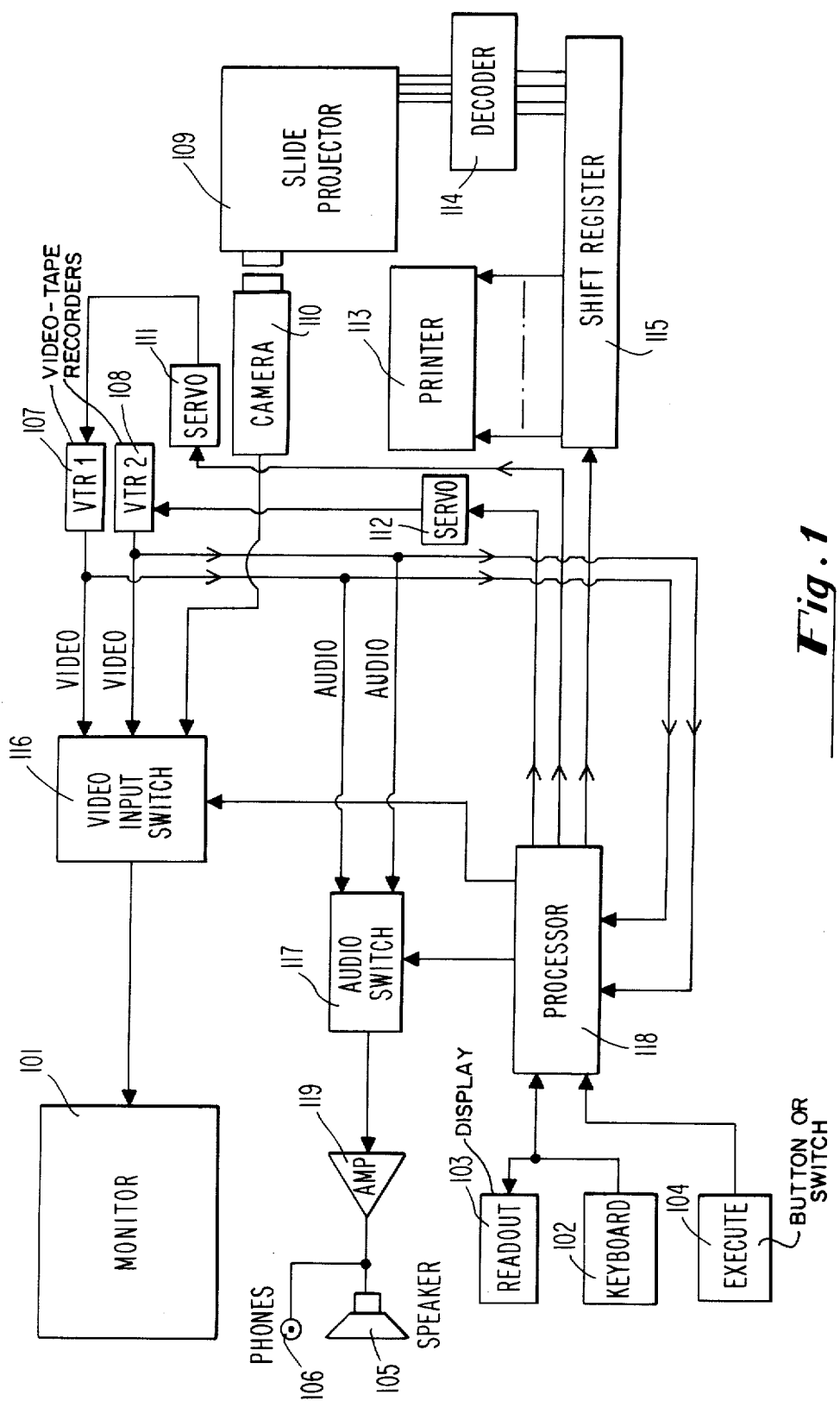
FIG. 1 shows a general block diagram of an illustrative embodiment of the present invention.

Referring first to FIG. 1, there is shown a block diagram of an illustrative embodiment of the present invention. The video display is by way of an monitor 101, typically a cathode ray tube (CRT) display, many types of which are readily available commercially. Audio presentation occurs by way either of a speaker 105 or earphones 106, whichever may be convenient. The user accesses a keyboard 102, typically of push button style such as are commonly used in calculators and telephones, whereby digital selection of any number of digits may be indicated. Such numbers as are selected at the keyboard are displayed at a plural digit readout display 103, embodied advantageously as digit readout tubes, light emitting diode displays, or other equivalent digital displays. The keyboard 102 is to be utilized by the user, in response to options presented at the monitor 101, whereby further flow of the program is chosen. In accordance with the principles of the present invention, the user is not bound to his first selection at the keyboard 102, but instead is able to change his selection any number of times until he decides on the appropriate option, whereupon an execute command at button or switch 104 energizes an operating sequence in the machine.

Internal audiovisual presentation equipment includes a random access slide projector 109 and at least one videotape recorder. In the embodiment of FIG. 1, two videotape recorders 107 and 108 are utilized, the outputs of which are coupled through a video input switch 116 to the monitor 101. Any slide which is displayed at the projector 109 is also coupled to the monitor 101 by the video switch 116, advantageously by scanning through a camera 110. In the embodiment of FIG. 1, audio aspects of the program are recorded on the first audio track of the videotape, and are coupled from the recorders 107 and 108 to the speaker 105 and earphones 106 through an audio selection switch 117, and, as necessary, appropriate amplification circuitry 119.

The basic control of the unit of FIG. 1 is by virtue of a processor 118, which regulates the audiovisual display material by selectively operating the switches 116 and 117, and the audiovisual equipment 107, 108, and 109 in response to selections made at the keyboard 102. Further, data is copied from the processor 118 to a shift register 115, whereby each step of the process 118 to a shift register 115, whereby each step of the process is recorded at a printer 113, and also is coupled for processing at a decoder 114 to drive the slide projector 109. The processor 118 also controls a pair of servomechanisms 111 and 112, which respectively operate the videotape recorders 107 and 108, advancing them as necessary to respond appropriately to a selection made at the keyboard 102.

In a preferred form, options are presented to the user by virtue of alternative selections on slides from the projector 109. The tapes on recorders 107 and 108 are divided into segments, each segment representing a response associated with one option from one of the slides at projector 109. Hence, if a slide presents four different options from which the user must select one, four corresponding segments will be found on the tapes at 107 and 108, with selection at the keyboard 102 and execute switch 104 causing the processor 118 to advance the appropriate tape to the corresponding segment, and to play that segement.

Videotape recorders 107 and 108 are advantageously embodied as off-the-shelf commercial recorders, and therefore each tape includes a video track and two audio tracks. In accordance with a feature of the principles of the present invention, video and audio are prespectively recorded on the first two tracks, but the second audio track (commonly referred to as the "audio two" or "cue" track) contains coded information directing performance of this system for subsequent operation. This coded information is coupled from the recorders 107 or 108, while their audio and video is being displayed, to the processor 118, thereby presenting control information for the subsequent steps.

A preferred mode of operation for the embodiment of FIG. 1 is as follows. The videotape recorders 107 and 108, and the slide projector 109 are set at some initial position, and the operation commences upon direction of the user, such as by manipulating the execute switch 104, or by typing in a predetermined initiate command at the keyboard 102. An initiating sequence is thereby commenced, which sequence may either contain introductions and explanations to the user, or may be the first part of an actual interactive routine. In either event, the introductory sequence includes the playing of at least one segment from one of the videotape recorders, during which playing time a serial code sequence is coupled from the recorder to the processor 118. As is discussed hereinafter, each such serial coding sequence includes directions for serially operating the various apparatus of FIG. 1, and also includes a body of data which is to be read into a memory in the processor 118, and which represents control information for subsequent operation, depending on the next option to be exercised by the user.

Once the introductory routine is presented to the user, the video selection switch 116 is caused to couple a slide from projector 109 to the monitor 101, thereby presenting to the user a plurality of options responsive to a video segment recently presented. For example, the initial sequence from the videotape recorder may have included remarks by a testy patient who has been subjected to considerable delay in a doctor's waiting room. The options shown to the user "doctor" on the next slide then would present a variety of tentative responses to the patient, perhaps varying from being curt and authoritative to apologetic and reassuring. Each option on he slide is numbered, and the user selects the respone of his preference by typing that number onto the keyboard 102 and pressing the execute switch 104. Such selection of an option by the user energizes the processor to commence operation in accordance with the control information coupled to the processor 118 from the videotape recorder 107 or 108 during the previous video display. The processor advances the appropriate recorder 107 or 108 to the designated segments by virture of the associated servomechanism 111 or 112, and when the videotape begins playing, couples the selected video and audio information for display by means of the switches 116 and 117. Simultaneously with the tape playing, a new set of control data is read from the cue track and is coupled to the processor 118 to regulate the next successive sequence of operations.

Figure 3A:
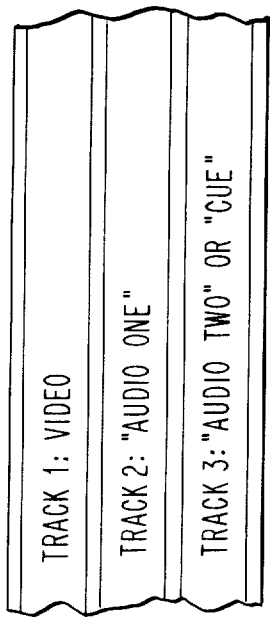
FIGS. 3a through 3c depict code arrangements utilized in accordance with the principles of the present invention.
Figure 3B:
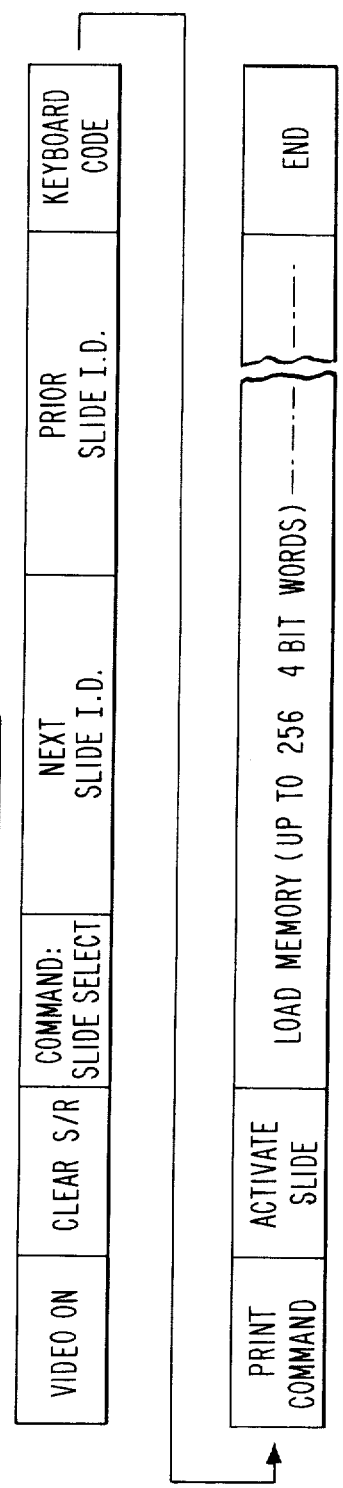
Figure 3C:
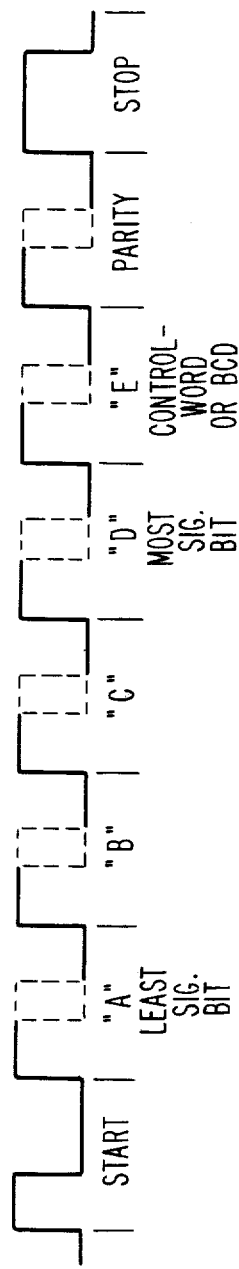

The above described operation may perhaps be better understood upon consideration of FIGS. 3a through 3c, which set forth a coding format for controlling such operation. Part (a) of FIG. 3 shows a portion of a typical magnetic videotape, including a video track, a first audio track and the audio two or cue track. As set forth above, in accordance with the present invention, the tape is divided into segments by conventional means, each segment including video information and associated audio on the first, or "audio one" track. The audio two, or cue track includes data for the next segment, and advantageous sequence of which is shown in FIG. 3b. Each code word is organized as set forth in part (c) of FIG. 3.

As set forth in FIG. 3c, a serial form of data is used, with each bit being represented by a phase encoding process. In the data sequence, positive transitions occur at fixed intervals, advantageously 300 per second. The negative transition of each bit is variable, however, to indicate the code. If the negative slope occurs less than one half cycle after the positive transition (advantageously three eights of a cycle), a locigal 1 is indicated, and if the negative transition occurs more than one half cycle after the positive transition (advantageously five eights of a cycle), a logical 0 is indicated. Thusly encoded, the binary data is organized into 8 bit words, the first of which always is a logical 0 and the last of which is always a logical 1. Following the first, or "start" bit, is a 5 bit binary sequence, the first four of which, designated A, B, C, or D, ranging from least to most significant, contain encoded information, and the fifth of which, designated E, is the control bit. That is, in accordance with the present invention, each binary word ABCD, either constitutes a command for a given mode of operation, or a binary coded decimal (BCD) representation of a number. The E bit indicates whether the ABCD bits constitute a control command (e.g., E + 0), or a number (e.g., E + 1). The seventh bit of each word sequence is a parity bit which is conventionally used for error checking.

Hence, digital sequences such as shown in FIG. 3c are self clocking, based on the fixed timing of the positive transitions, and are self-identifying in that each code word contains information showing the quantitative and qualitation nature thereof. The words are advantageously sequenced in accordance with FIG. 3b, whereby proper sequential operation of the embodiment of FIG. 1 is achieved. Typically, the first word in the segment, indicated as "video on", serves to activate the video display apparatus, thereby to occupy the user with a taped display responsive to his previous selection from an option slide. Next, the shift register is cleared, and the code control word for slide selection is presented. Immediately following, in appropriate binary code, are the identifications of the slide next to be presented. The processor is thereby energized to pass this information to the shift register. The next command is for the processor to pass the prior slide identification for printing, followed by he keyboard code which has just been selected. Finally, a print command causes each to be displayed at the printer. It is to be noted, then, that much of the function of the register 115 is to provide the printer 113 with an adequate permanent record of program flow. The "next slide" command, preceded by its identification code, actually controls subsequent operation.

Following the command for the printer to display information which was shifted into the register, the slide projector 109 is energized to access the identified next slide, the coded identification of which was placed into the register 115, and appropriately decoded at 114. Next following on the cue track of the tape is a large body of data which is to be loaded into a memory in the processor 118, and which embodies alternative commands to the system to proceed through proper subsequent operation depending upon which option is selected from the slide which has just been accessed at the projector 109. In a preferred embodiment, as set forth hereinafter, the processor memory is organized into columns with each column corresponding to a different option on the access slide. The processor continuously is scanning the columns of the memory, and when a given option is selected at the keyboard 102, and execute switch 104 is operated, data from that column in the memory is selected by the processor 118, and is utilized as set forth hereinafter to control operation appropriately. When the actual play of the video segment terminates, the next slide is projected by operation of the switches 116 and 117 by the processor 118 under control of the data with which it has resently been provided.

Figure 2:
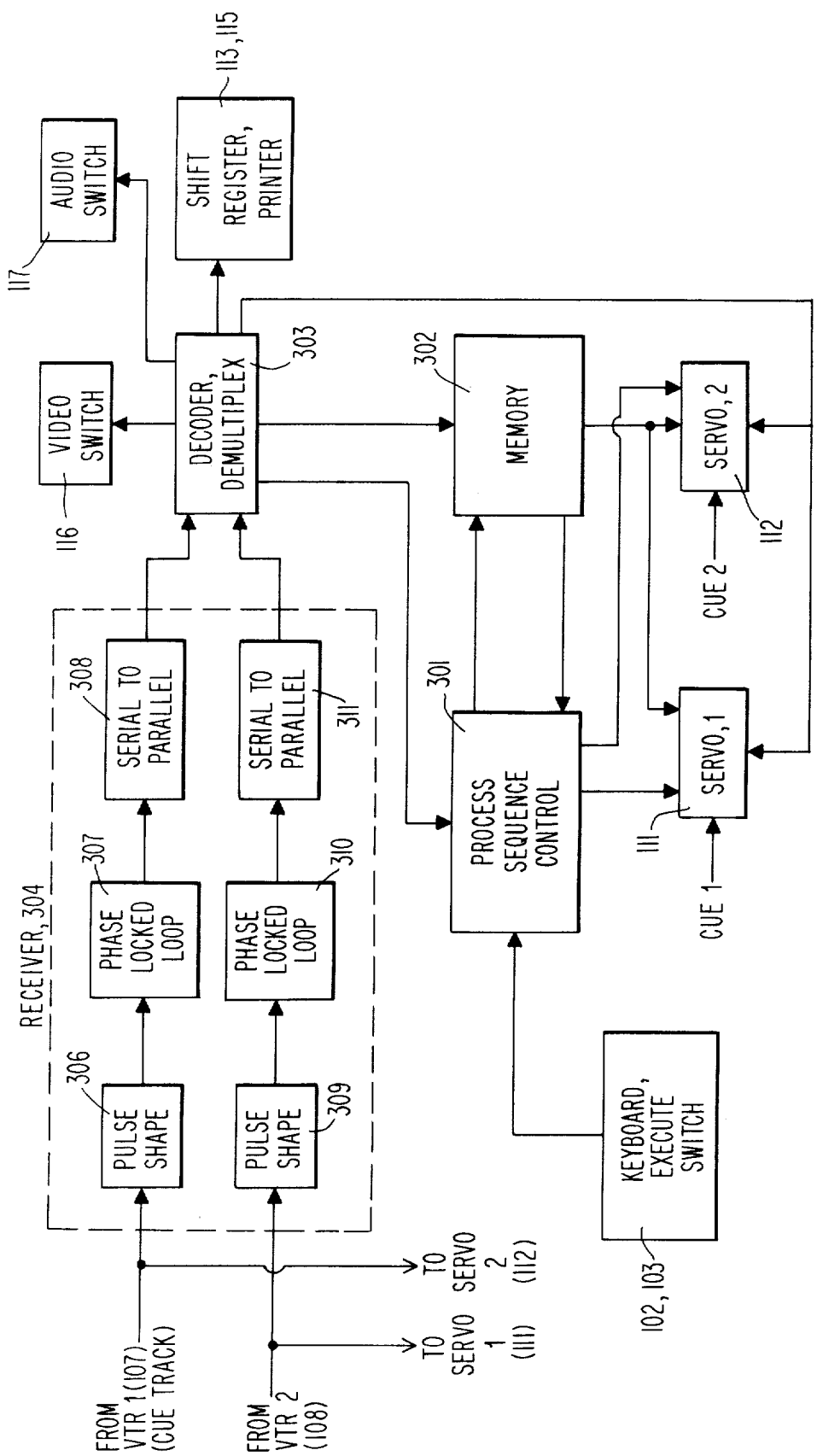
FIG. 2 shows a block diagrammatic representation of processing circuitry for the embodiment of FIG. 1.

The operation of the processor 118 may be better understood upon consideration of FIG. 2, which shows a block diagram of a preferred embodiment of the processor, interfacing appropriately with the other apparatus of FIG. 1. It is to be understood that FIG. 2 is greatly simplified for purposes of clarity, and that the interconnections shown are aggregated and simplified versions of the detailed embodiment following. The keyboard and execute switch 102 and 103, the shift register 115, the video selection switch 116, and the servomechanisms 111 and 112 are numbered similarly to their counterparts in FIG. 1. The apparatus of FIG. 2 is adapted to operate in conjunction with the foregoing formatting and code arrangement of FIGS. 3a through 3c, as set forth hereinbefore. Data from the cue track of the videotape recorders 107 and 108 is coupled to a receiver 304 which serves the function of sensing the data and of reconstituting it as needed. The receiver includes two parallel paths for processing data respectively from the first videotape recorder 107 or the second videotape recorder 108, which as shown are identical to one another. It is to be understood that a single sequence of processing apparatus could also be utilizied, which processes data from both recorders.

Each path of the receiver 304 includes a pulse shaper 306 and 309, a phase locked loop 307 and 310, and a serial to parallel converter 308 and 311. Thereupon, both data paths are coupled to a decoder and de-multiplexer 303.

As the data is sensed on the cue track of the respective videotape recorders 107 or 108, it is merely a serial bit stream having a pulse rate of 300Hz, with each pulse having a duration of three eighths or five eights of a cycle to represent binary digits. First, the data is appropriately shaped at 306 and 309, such as by a conventional schmidt trigger circuit, thereby to convert the fairly irregular wave form from the cue track of the videotape recorder into a precise, regular wave form with a fast rise time, which is suitable for use in digital logic. Then, the "cleaned up" bit stream is coupled to a phase locked loop 307 and 310, which insures accurate timing thereof and which facilitates conversion of the phase encoded information into a more standard binary wave form. To this end, each of the loops 307 and 310 terminate in logic, including a flip flop which generates a pulse for each pulse encoded bit having a three eights duty cycle, and no pulse for each pulse encoded bit having a five eights second duty cycle.

The binary data, appropriately timed and shaped, is coupleld to serial to parallel conversion apparatus 308 and 311, advantageously of the type commonly available in integrated circuit form and generally known as the Universal Assynchronous Receiver and Transmitter (UART). The UART circuits 308 and 311 each take input pulses, convert them to a parallel format, check the parity of each word, and produce a five bit parallel output consituting bits A, B, C, D, and E, of the wave form of FIG. 3c. Also advantageously, the phase locked loops 307 and 310 employ a pulse division rate of 16, which is utilized by the serial to parallel converters 308 and 311 at the higher rate (i.e., 16 times the information rate) to convert the data. For each such parallel word which is synthesized at 308 and 311, a signal is passed to the decoder 303 indicating that a five bit word is ready to five bit word is ready to be acted upon. From this point, the words are handled in bit parallel fashion by the remaining apparatus.

The decoder and de-multiplexer 303 functions to sense the five parallel bit words from the receiver 304, to sense whether they are commands or numbers, and based on the nature of the commands and the sequence of the words, to distribute them to the appropriate respective apparatus, as desired. Specifically, the decoder 303 first senses the E bit, and if it is a logical 0, notes that a code instruction is embodied therein, and converts the code to one of 12 specific actions which correspond to various system operations. If the E bit is a logical 1, and the ABCD code word thereby represents a number, that BCD number is conveyed through the apparatus in accordance with a previous command. This distribution of data, which includes processing and distribution of both encoded commands and BCD encoded numbers, forms the basis of the demultiplexing operation attributed to the decoder 303 in FIG. 2.

The detailed interconnection of the decoder and demultiplexer 303 with other apparatus in the system is set forth in the following discussion of FIG. 5, but some of the more general interconnections are represented in FIG. 2. Among them are operation of the video switch 116, and coupling of data to the shift register 113 and printer 115, conveyance of data to the servomechanisms 111 and 112, and the audio switch 117.

One important data transmittal function performed by the decoder 303 is the provision of data to a process sequence controller 301 and a memory 302. As mentioned hereinbefore, it is the memory 302 which receives and stores data corresponding to various options being offered the user. Whenever the user makes his selection, it is the corresponding data in the memory 302 which is sampled by the process sequence controller and which is utilized to energize and control the next sequence of operation (specifically, to operate the servomechanisms 111 and 112, the recorders 107 and 108, and the like). Principally, the amount and type of data which is read into the memory from the cue track of the tape during execution of the prior segment is dicated by the location on the videotapes of the next segments to be executed, depending respectively on the options to be presented to the user. That is, for each such option, the memory 302 (which is organized into columns) includes a different column of bit parallel words organized in a format designed to facilitate proper subsequent sequential control.

An advantageous organization for each column, which is utilized in accordance with the embodiment disclosed herein, is as follows. A first word (identified as location number 0) carries no data at all and thereby provides a time slot during which the keyboard develops information. The next three locations, identified as words 1 through 3 respectively, display three BCD numbers, the first two of which are used for slide identification and the third of which identifies the step in the program currently being executed. Locations 4 and 5 are not used. Location 6 identifies the videotape machine on which the selected segment is presented, the direction to the next position, and a constant for the servomechanism. Locations 7 through 11 are unused, and locations 12 through 15 inclusive present the actual distance to be wound on the tape to get to the segment. Advantageously, location number 12 is allocated the thousands place, location 13 the hundreds place, location 14 the tens place and location 15 the units place. A command which follows is allocated to a control signal referred to herein as "load ram bar", or $\overline{LR}$, which indicates the end of the data in that column, and prevents inadvertent loading or unloading of spurious information to or from the memory.

It may therefore be seen that the memory contains sufficient information in each column to control subsequent operation once a corresponding option is executed by the user and the process sequence control samples that column from the memory 302.

An important aspect of the principles of the present invention relates to the operation of the servomechanisms 111 and 112 under control of the process sequence controller 301 and information from the memory 302 in order to operate the videotape recorders such as 107 and 108. Conventional videotape recorders utilized in accordance with the principles of the present invention, such as the ones available under the trade name "IVC 800-A-SM-C", utilizes two AC torque motors to handle the winding of the tape, one on each reel. When in play, the two torque motors operate in opposite directions, to each other, with the torque of each being different, thereby to determine the direction of tape displacement. When playing the tape, the actual torque applied to the motors is very small, a fraction of that of which the motors are capable. For winding speed, however, the motors run basically at full power. That is, whichever reel happens to be taking up tape has full power in the sense of the winding direction, and the other has a reduced amount of torque in the sense opposing the first so that tape tension is maintained but at the same time the tape is rapidly wound into the take up reel.

In order to stop the machines, a special mode is included which connects a resistor in series with both motors. This reduces the amount of power applied to the two motors and then the motors are connected in the sense of winding the tape opposite the direction to which it is going, i.e., to decelerate the tape to 0 speed. The decleration occurs at a fairly steady rate and when velocity reaches 0, sensors in the machine cut off power in both motors and the machine is positioned to be played.

Based on these inherent properties of the common class of reel to reel tape recorders, the present invention involves servomechanism control which effectively minimizes access time between selection of a preferred option by the user and commencement of playing of the corresponding video segment, during which time control information is coupled from the memory to the servomechanisms, and the appropriate videotape recorder is advanced to exactly the beginning of the associated segment.

From Newtonian physics it is established that distance covered during deceleration is equal to the square of the velocity over twice the acceleration rate. That is:

$$d = v^2/2a$$

where $a$ is the acceleration (conventionally involving a negative sense for deceleration), $v$ is the velocity, and $d$ is the distance. For the tape advancement on the machines in question, deceleration at a given point on the tape is constant, so the distance there is proportional to $v^2$, the velocity, with the proportionality constant being $\frac{1}{2}a$, or the reciprocal of twice the deceleration. The servomechanism control in accordance with the present invention utilizes this relationship and controls the tape advance by monitoring the distance to go as compared with the square of the instantaneous tape speed. It may be recalled that information stored in the memory includes the identity of the tape recorder upon which a segment is stored, the tape location at which the segment begins. Since in the present invention, location of the tape on the machine and the deceleration properties of the machine at that location are known, the "distance to go" between the present location and the desired location may be calculated instantaneously, and the self-clocking 300Hz code on the cue track of the tape permits evaluation of the instantaneous speed of the tape at any time as the tape is advancing.

Accordingly, when the option is selected, the appropriate tape recorder is switched into the winding mode in the appropriate direction, and the instantaneous tape speed and the instantaneous distance to go are calculated on an ongoing basis. Application of the proportionality constant $\frac{1}{2}a$ to the square of the instantaneous velocity, yielding a speed control signal herein designated $s$ for convenience, allows for determination of the differential between the distance to go $d$ and the speed control signal $s = v^2/2a$.

The control criteria for deceleration of the tape in accordance with the present invention are as follows. So long as the distance to go is larger than the speed signal $s$, the motors are allowed to advance at their maximum acceleration and speed toward the desired point. When, however, the distance to go $d$ becomes equal to the speed signal $s$, the machine is switched into the stop mode and deceleration commences. During the time of deceleration, the distance to go and the instantaneous speed signal s are continuously developed and compared with one another, and deceleration is increased or decreased in order to tend to satisfy the quality $d = s = v^2/2a$. Thus, if the distance d becomes smaller than the speed signal $s$, the deceleration rate is slightly increased, the vice versa. Such a control methodology insures that the speed of the tape will become 0 exactly as the distance to go becomes 0, i.e., whenever the beginning of the desired tape segment is reached.

During the deceleration control aspect of the process, the servomechanisms operate on the videotape recorders by altering the resistance which is in series with the motors. This may be done by actual resistance variation, or, as is done in the preferred embodiment described hereinafter, by varying the current fed to the fixed resistor in the machine while keeping the voltage thereon constant.

In partial summary, therefore, FIGS. 1, 2, and 3a through 3c together with the foregoing description sets forth a system for interactive audiovisual display of multiple branching programs. As set forth above, the videotape recorders 107 and 108 are advantageously embodied by commercially available IVC Model 1800-ASM-C recorders. The slide projector 109 is conveniently embodied as a Kodak random access slide projector commercially available under the model designation RA-961 B, and the camera 110 is a General Electric mode TE-33 camera. The monitor 101 is conveniently embodied as a Sony model CVM-1225 monitor, and the printer 113 as a Newport model 180 Digital Line Printer.

Figure 4:
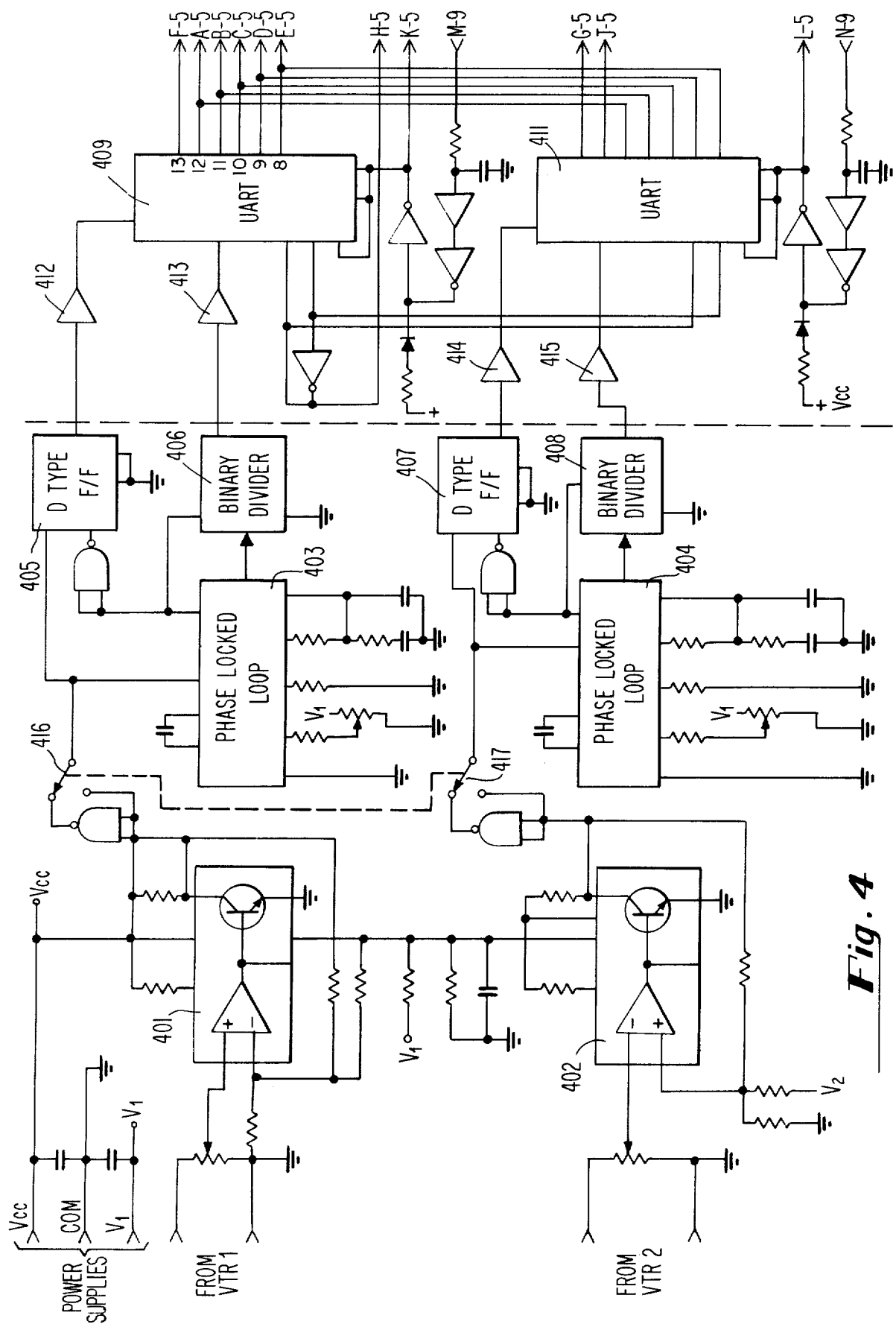
FIG. 4 shows data processing circuitry for the FIG. 2 embodiment wherein data in the format of FIGS. 3a through 3c is assembled in appropriate form for further processing.
Figure 9:
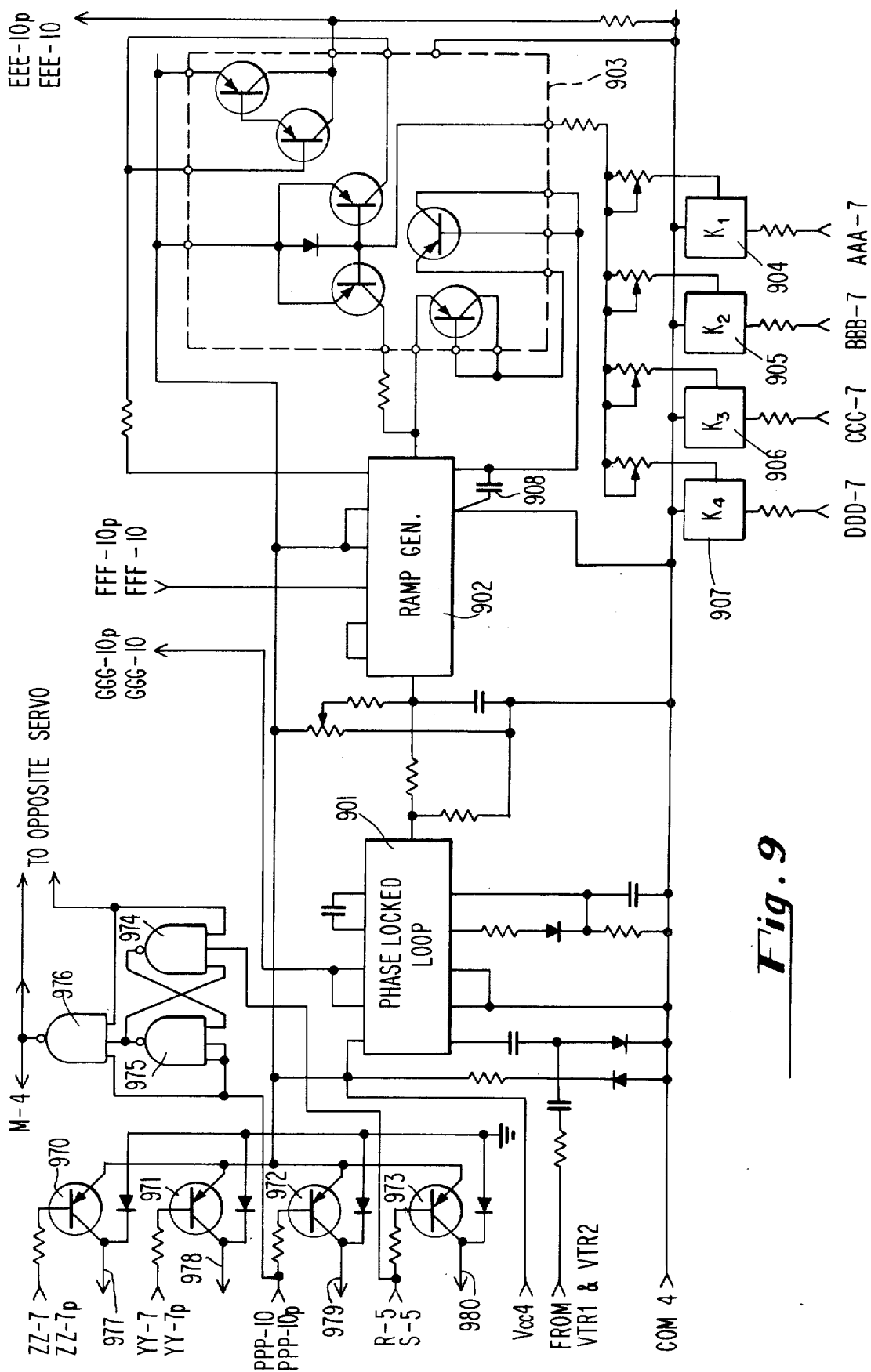
FIGS. 9, 10, and 11 show detailed logic for a tape conrolling servomechanism in accordance with the principles of the present invention.
Figure 10:
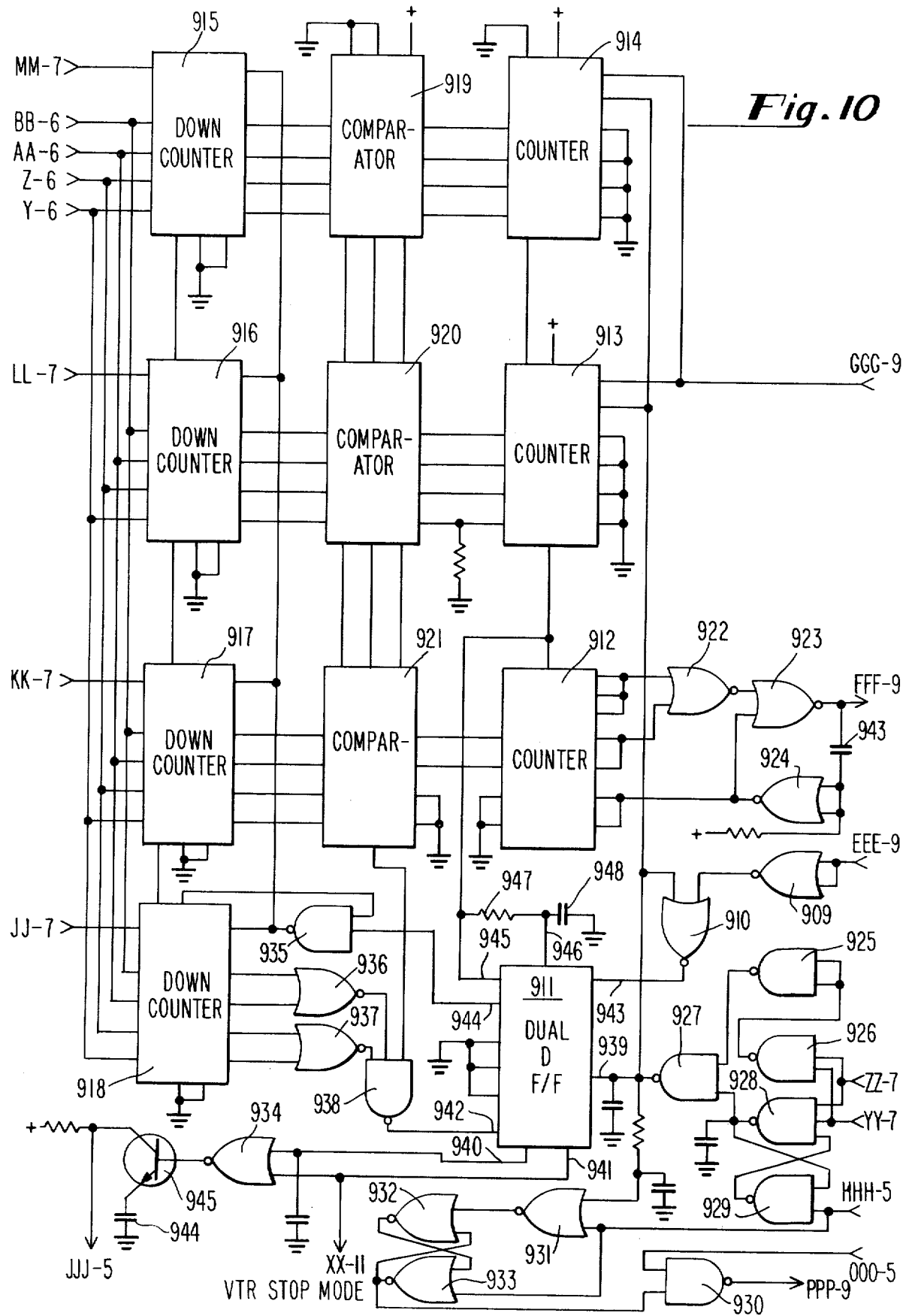
Figure 11:
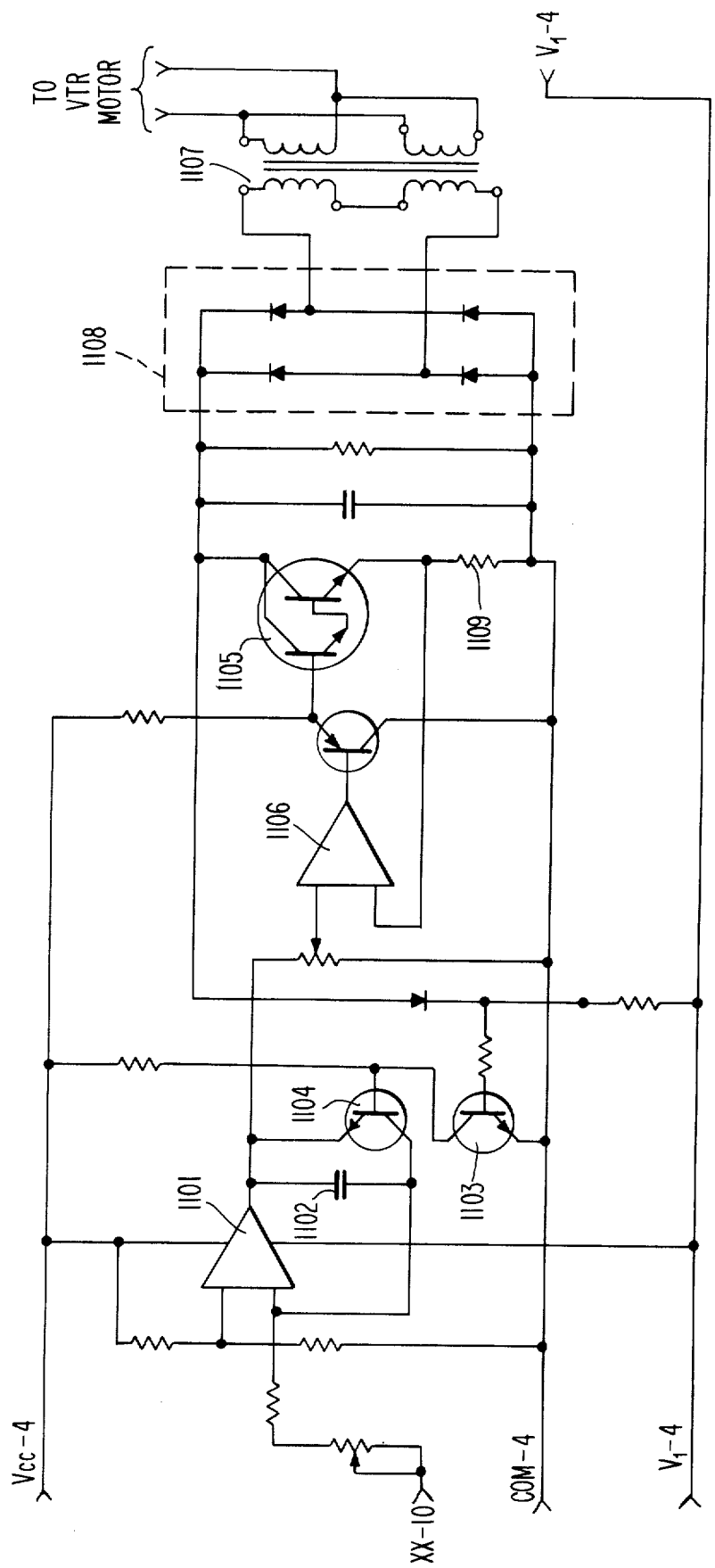

FIGS. 4 through 11 set forth detailed circuit embodiments for the processor 118 and the servomechanisms 111 and 112. In FIGS. 4 through 11, figure to figure interconnections are represented by corresponding upper case letter designations. For each terminal the letter designation is followed by a number indicating the figure wherein its counterpart is located. Hence, terminal M-11 in FIG. 4 indicates that terminal M in FIG. 4 is interconnected with terminal M-4 in FIG. 11. Correspondingly, the counterpart terminal in FIG. 11 is labeled M-4 to indicate the interconnection with thermal M-11 in FIG. 4.

FIG. 4 shows a detailed logic schematic for the datal receiver 304 of FIG. 2. As set forth hereinbefore, the receiver incorporates two parallel paths, one from the first videotape recorder 107 and another from the second videotape recorder 108. These paths close at the output of the receiver 304 to couple encoded quantities in bit parallel fashion to the decoder and de-multiplexer 303 which is detailed in FIG. 5. The data receiver of FIG. 4 also includes connections for positive and negative power supplies VCC and V1, and a common terminal. Throughout the other schematic diagrams, interconnection is made to these terminals of FIG. 4.

Data from the cue tracks of VTR1 and VTR2 is coupled at the lefthand side of FIG. 4 from the respective recorders, and at that point constitutes a series of positive going peaks and a series of negative going peaks corresponding to the positive and negative transitions of the phase encoded words on the tracks. One transition is the fixed rate 300Hz timing phase, and the other in each case is the phase encoded digit. Signals from the cue tracks are respectively coupled through Schmidt trigger circuits 401 and 402, which square off the wave forms and turn them to conventional binary logic levels of 1s and 0s represented respectively by voltage levels of positive 5 volts or 0 volts. Switches 416 and 417 provide polarity control. The shaped date is then coupled to a pair of phase locked loops 403 and 404, which among other things function conventionally to lock the phase of the input data with a local oscillator. The phase locked loops 403 and 404 are commercially available integrated circuits such as those known as CD4046AE, and operate in conjunction with binary dividers 406 and 408, which are embodied as those available under the designation CD4024AE. Together, the phase locked loops 403 and 404 with their respective dividers 406 and 408 allow for production of a phase locked 4800Hz clock signal.

The phase locked loops 403 and 404 operate on the encoded data in respective conjunction with the D-type flip flops 405 and 407 as follows to decode the phase encoded signal into logic represented by voltage levels. Conventionally, the phase locked loops include a phase comparator which compares the input signal with a signal from a local oscillator, and generates an error signal in proportion to the phase differential. That phase error is utilized to control the input of the local oscillator, which is a voltage controlled oscillator. The binary dividers 406 and 408 are conventionally utilized to reduce the frequency of the local oscillator to the frequency range of the input data. In FIG. 4, the phase locked loops 403 and 404 feature phase comparison based on the positive going excursion of the respective signals, thereby utilizing the fixed phase 300Hz transition of the information signal.

It may therefore be seen that a time reference is provided relative to which the variable phase, information-bearing negative transition of the input signal may be utilized for toggling, or prevented from toggling the respective D-type flip flops 405 and 407. That is, at a time corresponding to 50 percent duty cycle, the flip flops 405 and 407 are enabled to store the logical quantity presented at their input. The binary dividers 406 and 408 are utilized at 16 times the clock rate to operate the UART circuits 409 and 411. Buffers 412, 413, 414, and 415 interface the flip flops 405 and 407 and the dividers 406 and 408 with their corresponding UARTs 409 and 411, and thereby provide sufficient current to drive the UART integrated circuit chips.

Conventionally, the UART unit constitutes a semi-independent data transmitting device, the transmitter of which assembles data together and transmits it serially and the receiver of which receives serial data and assembles it in parallel form. In FIG. 4, only the receive aspect is utilized, in order to produce bit parallel encoded words for the subsequent operation. Also conventionally, when the parallel word is synthesized, a "data ready" signal is generated. Circuits 409 and 411 utilize the data ready signal at H-5 for internal purposes and in order to energize the decoder of FIG. 5. By means of input connections M-9 and N-9, the respective UARTs 409 and 411 are enabled only after the corresponding videotape recorder is in the playing mode and valid data may be received from the associated cue tracks. The bit parallel output words are produced at terminals A-5 throuh E-5, which respectively represent the ABCD and E bits. Terminals F-5 and G-5 indicate the results of a parity check.

Figure 5:
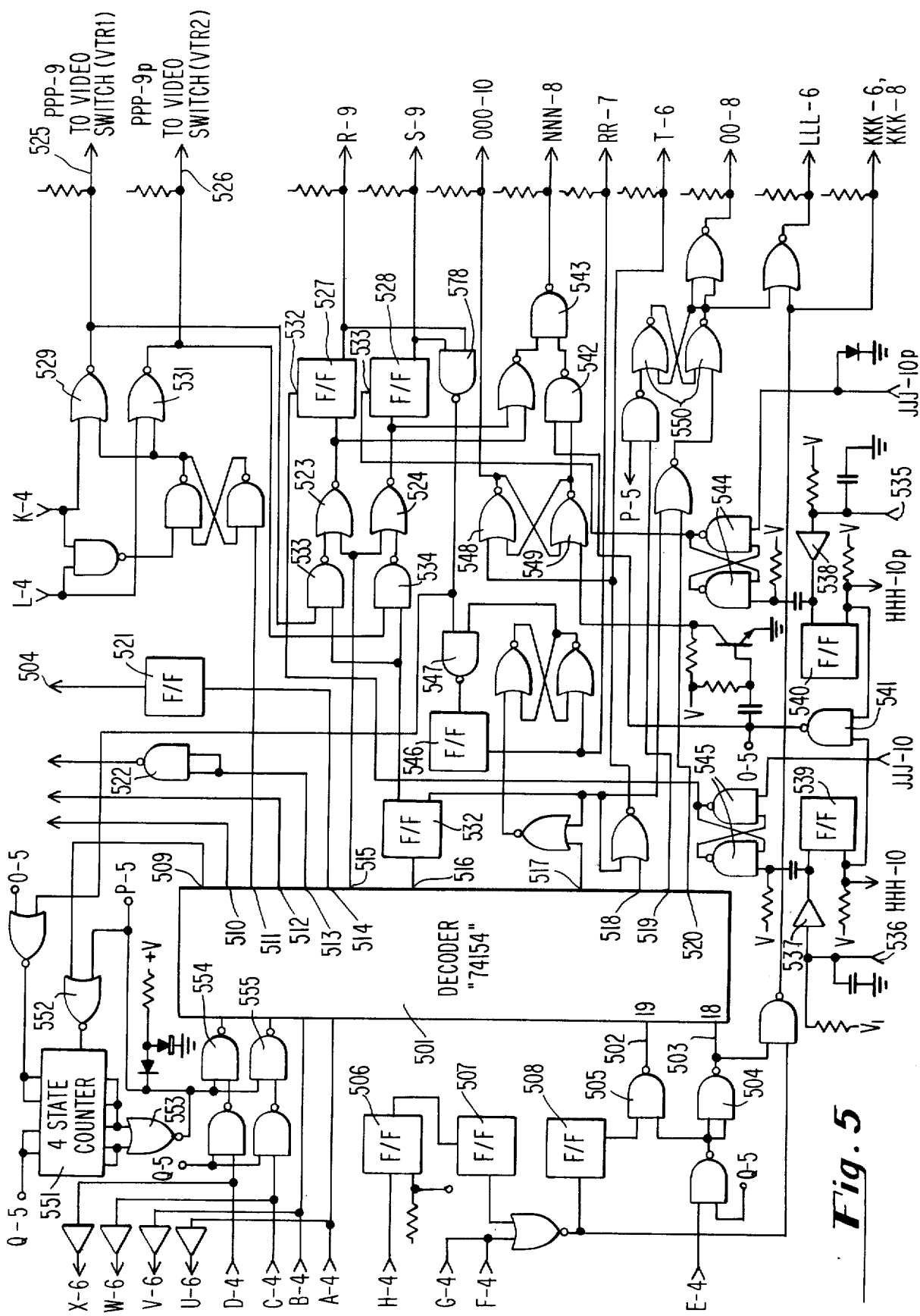
FIG. 5 shows a data decoder and de-multiplexer for the FIG. 2 embodiment which operates in accordance with the code of FIGS. 3a through 3c.

Referring next to FIG. 5, there is shown decoder and de-multiplexing circuitry which constitutes a preferred embodiment for decoder 303 of FIG. 2. The heart of the decoder of FIG. 5 is an integrated circuit 501 commercially available under the designation 74154. The decoder 501 itself has six inputs including the 4 binary bit inputs from terminals A-4 through D-4 and two enabling inputs 502 and 503, both of which must be logical 0's for the decoder to process one input word. The decoder 501 is conditioned to sense the 4 bit binary input and to energize a corresponding one of 16 possible outputs from a normal logic 1 state to a logic 0 state. Since a given output is set to a logic 0 state only if both of input terminals 502 and 503 are a logical 0, a number ABCD having E =1 is not processed by the decoder 501. If both terminals 502 and 503 are 0, not only is ABCD a command to be decoded, but furthermore a valid parity check has occurred.

Decoding of a given word is energized by receipt from the UART 409 or 411 at input connection H-4 of the "data ready"reset signal. That signal, which is 1 microsecond in duration, and which represents a valid code word proper parity check, fires flip flop 506 which is a 1 shot multivibrator, yielding a pulse of approximately 300 microsecond duration. Flip flop 506 in turn fires yet another multivibrator 507, yielding a pulse of approximately 3 millesecond duration. Assuming the parity bits from terminals G-4 and F-4 are 0 and valid, flip flop 407 energizes 1 shot multivibrator 508 yielding a pulse of approximately 12 millisecond duration, and thereby conditioning gates 504 and 505 for receipt of the E bit from terminal E-4. The succession of 1 shot multivibrators 506 throug 508 provides proper timing. Properly conditioned at enabling terminals 502 and 503, the decoder 501 processes the input word ABCD from input terminals A-4 through D-4 respectively. Depending on the code combination which is received, a corresponding one of output terminals 509 through 520 is energized to a logical 0 state. It is to be noted that only 12 of the output lines of the decoder 501 are utilized, although 16 are available, because 12 output commands are needed in the preferred embodiment described herein. Some of the commands are utilized to energize system process steps directely, and these are represented at output terminals 510, 512, 513, and 514 of decoder 501. Due to the interactive nature of the operation, other output signals require further logical processing which is set forth hereinafter. In the preferred embodiment set forth, the duration of a valid word at the input terminals last approximately 27 milliseconds, and an output state of logical 0 has a 1 millisecond duration.

An input command of 1000 directly energizes the paper advance in the printer at terminal 510. An input word of 0010 produces an output logical 0 at terminal 512, and thereby constitutes a print command for the printer. The activation of a slide at the random access slide projector is nearly direct, and is represented by a logical 0 at output terminal 514, but is coupled through a 1 slot multivibrator 521 to produce the requisite control signal duration for the slide projector of approximately a quarter of a second. An input command of 1100 energized terminal 513 to a logical 0 state, which is inverted at 522 and is utilized to clear the shift register.

Receipt of the input word ABCD = 0110, which produces a logical 0 at output terminal 516 of decoder 501, is designated the "latch enable" signal. The latch enable is not a signal which per se actuates any given process or operation in the machine. Instead, it is an energizing signal which permits certain other commands in order to insure proper operation. Hence, the video stop, video on, execute enable, set index, and load ram commands have no effect unless circuitry is previously conditioned by the latch enable signal.

The remainder of the ouput connections from decoder 501 utilize certain amounts of logic and gating. The signal which causes the videotape recorder to come to a stop when it is in the playing mode requires not only a stop signal, but also information as to the condition of the videotape recorders. A stop command of 0101 causes output terminal 515 of the decoder 501 to go to a logical 0 state, which in turn is coupled to NOR gates 523 and 524. In turn, one or the other of the gates 523 and 524 has been preconditioned by control signals which operated the video switches via output terminals 525 and 526. Hence, one or the other of NOR gates 523 and 524 is energized by a logical 0 from output terminal 515 of decoder 501 to fire one or the other of 1 shot multivibrators 527 and 528. Video stop signals are thereby produced at output terminals R-10 or S-10, having a duration of approximately 1 half second, to stop the corresponding videotape recorder by means of its remote control input.

The video "stop" logic is also interrelated with the "video on" condition, which is represented by a code state of ABCD = 0100, which energizes output terminal 511 of decoder 501 to a logical 0 state. The logical 0 at terminal 511 thereby energizes one or the other of NOR gates 529 or 531, depending upon which videotape recorder was indicated by signals from the respective UART circuits of FIG. 4, received at terminals L-4 and K-4. Hence, video on signals are produced at 525 and 526, and are also coupled back to precondition the video stop state at NOR gate 523 and 524. Hence, the signals are interconnected in such a way that the stop signal cannot operate unless a video on signal had occurred first. This provides a safeguard to the operation, since the video signals are often located close together on the tape, for purposes of economy. Hence, since the videotape recorders require a few seconds running time before actual commencement of the playing, it may be necessary to have the servo stop the tape in the middle of a preceeding video segment, and if the on and off commands were not interrelated, the stop could be effectuated even though the tape is sitting in position only because the servo brought it there for the next segment.

For the video on and video stop signals already discussed, the latch enable signal, which in all instances first fires a 1 shot multivibrator 532, permits operation of the video on and video signals by conditioning AND gates 533 and 534.

It is noted that the videotape machines are stopped by the "video stop" command from terminal 515 when the play mode is utilized, but the machines are also to be stopped when they are in the winding mode by the servomechanism. That stop signal is also accomplished by the 1 slot multivibrators 527 and 528, but it is done by receipt of signals at input terminals 532 and 533 thereof, which are conditioned by logic located at the bottom of FIG. 5. Whenever the videotape recorders are operating in the wind mode and deceleration, a logical 0 signal is coupled to input terminals 536 (from VTR1) and 535 (from VTR2). When that signal shifts back to a logical 1, the machine has come to rest, which through buffers 537 trigger 1 shot multivibrators 539 and 540 to produce an output signal of approximately 200 millisecond duration. The output signal thereby produced is coupled by terminal HHH-10 (or HHH-10P, depending whether VTR1 or VTR2 is being used), directly to the servomechanism apparatus of FIG. 10. This indicates that the machine has completed movement due to the servomechanism, has come to a standstill, and is ready to be put in the play mode. The "end of deceleration" signal at the machine, referred to hereinafter as EOD, also proceeds to switch the videotape recorder into the play mode via NAND gates 541, 542, and 543 unless inhibited at gates 548 and 549, as set forth below. When the servomechanism is in operation and the speed signal $s$ for the first time exceeds the distance $d$ to go, a signal is received from the servomechanism at terminals JJJ-10 or JJJ-10P to set an associated flip flop 544 or 545 and in turn setting the multivibrators 527 and 528.

An execute enable command 1001 energizes output terminal 517 of decoder 501 to a logical 0 state, and thereby conditions logic to cause the videotape to advance to predetermined rest stop positions on the tape. In order for the execute enable to do so, it is necessary for the video signal to be in the stop mode, and to this end a 1 shot multivibrator 546 is fired by an execute enable command only if a stop command is received at NAND gate 547 by way of another NAND gate 578. The execute enable signal is given immediately prior to the stop signal, which is the last actual command on the given video segment. Thus, multivibrator 546 is triggered only if an execute enable signal occurred prior to the stop, whereupon the appropriate action is actuated at the process controller via connection RR-7. So far as the servomechanism is concerned, a signal at terminal RR-7 is equivalent to an activation, and the servo sets the machine in the winding mode, which is directed to the last data loaded into the memory, the location of a rest stop. The machine will come to a stop at the rest stop, in accordance with the logic described hereinbefore, but it will not go into the play mode because a play inhibit signal is produced at the gates 548 and 549.

An input command of 1110 produces a logical 0 at terminal 518 of the decoder 501, and is designated a "set index" command. The set index is the signal referred to hereinbefore which resets the flip flop of the gates 548 and 549.

An input command of 1011 produces a logical 0 at output terminal 519 of decoder 501, and initiates loading of the memory. Receipt of an 0001 signal produces a logical 0 at output terminal 520 of the decoder 501, which terminates the memory loading operation. This is accomplished by the setting of a multivibrator 550 by the "load ram" signal (i.e., begin loading the memory) and the resetting thereof back to the logical 0 condition upon receipt of the "load ram bar" signal.

A protective feature in the logic of FIG. 5 involves an allocation for input code state 0011, designated hereafter as the "initiate" command. A convenient method of programming the tapes is to do so one segment at a time, but such a procedure generally involves introduction of a transient before each video segment. Also, transients are likely to occur at each resumption of the play mode, when data begins to be coupled to the decoder of FIG. 5. In order to avoid erroneous reading of these two transients as data, the initiate command is provided. In particular, the encoded initiate command 0011 is placed 3 times successively at the beginning of each segment, and the decoder includes apparatus for counting and identifying the proper condition. Specifically, the initiate command is the only one having an encoded designation AB = 11, and each time that combination occurs, output terminal 509 of decoder 501 assumes a logical 0 state. In turn, the logical 0 is coupled through NOR gate 552 to increment a 4 state counter 551. Whenever the counter 551 reaches a binary count of 3, NOR gate 553 is energized, and NAND gates 554 and 555 are enabled for coupling the C and D input digits to the decoder 501. Also, the NOR gate 553 output is coupled back to NOR gate 552, and prevents further incrementing of the counter 551.

Figure 6:
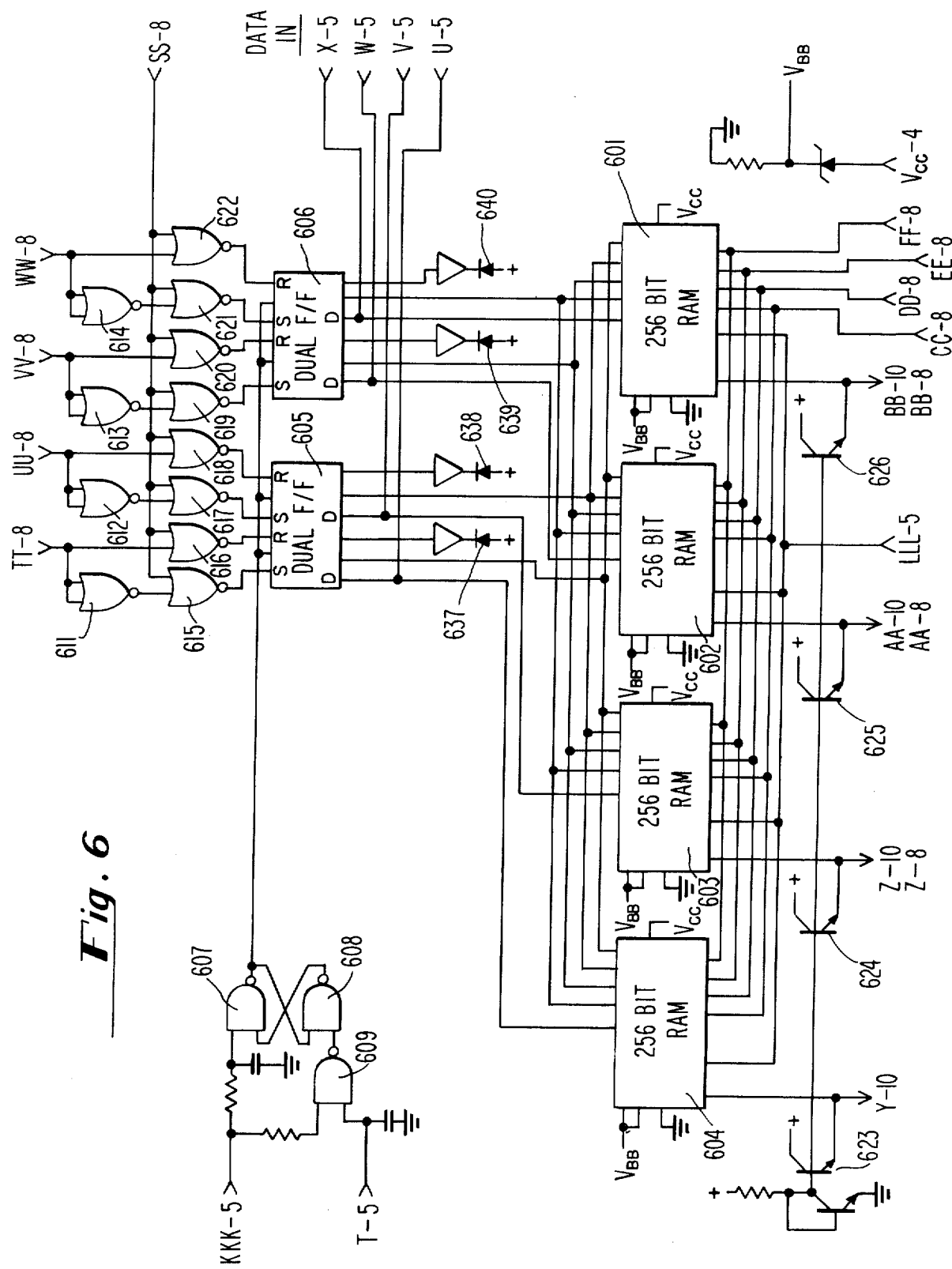
FIG. 6 shows a detailed embodiment of a memory operable in the FIG. 2 apparatus.

In summary, FIG. 5 includes logical processing circuitry whereby the verified bit parallel information from the receiver is divided into separate commands which serially actuate select processes within the other apparatus, thereby effectively decoding and de-multiplexing control and numeric information. FIG. 6 shows a preferred embodiment for a memory useful in conjunction with the principles of the present invention. As set forth hereinbefore, the basic function of the memory is to store encoded information for controlling subsequent operation once an execute command is made, and largely therefore includes storage of information for manipulation of the servomechanism and the videotape recorders.

The storage aspect of the memory includes 4 standard 256 bit random access memory chips 601 through 604 which are organized into 16 groups of 16 words each. The memory chips 601 through 604 are conveniently embodied as random access memory integrated circuits commercially available under the designation "1101A". Such circuits provide an 8 bit address for each location of each chip, thereby providing the desired 256 locations. Both for purposes of reading or writing, access occurs based on the 8 bit address. In accordance with the configuration set forth in FIG. 6, the 16 columns are operated according to the information which is stored in the preferred order set forth hereinbefore, and the 16 rows correspond to the choice on the keyboard corresponding to a given option. Generally, of the 16 available rows, many will go unused, since generally many fewer options than 16 are presented the user. Both for purposes of writing in the memory (i.e., loading the memory during execution of a given video segment), and upon write out of a given column of information (i.e., whenever an option has been selected and the execute button operated by the user), the given row is thereby selected and a sequencing through the columns occurs by providing and incrementing a 4 bit binary number at terminals CC-8 through FF-8 from the process control board. As is set forth hereinafter, that sequencing occurs under control of a timer, so that the 16 rows are successively accessed in incremental fashion, and the data is coupled out at terminals Y, Z, AA, and BB. Transistors 623 through 626 merely provide a voltage clamping operation for the output digits from the memory elements 601 through 604.

The columns of the memory elements 601 through 604 are selected in two fashions, depending on whether writing or reading is desired, but in either case the action occurs through a pair of dual flip flops 605 and 606. Each of the dual flip flops 605 and 606 comprises two double action multivibrators, capable of operation as a D or as an RS flip flop. The D-type function is utilized in writing data from the decoder into the memory elements, and the RS function is utilized in conjunction with the keyboard and execute operations to read out a given column from the memory elements 601 through 604.

The loading of the memory occurs whenever a set index command is received from the decoder at input terminal T-5. The set index command thereby sets an RS flip flop consisting of NAND gates 607 and 608. It is noted that this set operation is enabled at NAND gate 609 by a shift register clock signal at KKK-5. The data from the decoder is presented at terminals U, V, W, and X, which data respectively is coupled to the D inputs of the flip flops 605 and 606 from buffers in FIG. 5. Since the set index (E = 0) for the associated ABCD word via gates 607 and 608 set the respective flip flops 605 and 606 to the initial condition, the data which is next represented at terminals U, V, W, and X are latched into the flip flops 605 and 606. This occurs because E = 1, and a shift register clock signal (SRC) is provided to reset gates 607 and 608, which clocks the flip flops, and stores data at U, V, W, X. The data pulses are thereby fed to the address of the memory thereby indicated in conjunction with the concurrent binary state at terminals CC through FF. The next significant command would be the load ram signal, which through operation of the processor of FIG. 8 permits loading of the random access memory to begin. That is, the decoder produces the signals to condition the flip flops 605 and 606 for entry of data via terminals U, V, W, and X, and the next 16 words sequentially correspond to increments in count at terminals CC through FF, whereupon the appropriate data is read into the memory elements 601 through 604. Data is written into elements 601 through 604 under control of a "write" control signal at LLL-5.

By continuously indexing the count at terminals CC through FF, the process controller effectively is scanning the random access memory. Thus, when at any time a keyboard selection is made and the execute switch is operated, that corresponding column may be read out of the memory 601 through 604. The keyboard selection encoded at the process controller into binary coded decimal is presented at terminals TT, UU, VV, and WW. A keyboard enable signal (KBE) is generated in FIG. 8 for the first one-fourth second after the user presses the execute button. During this time, it goes low during scanning the first, or "zero" location of the memory. Termination of the of the signals at TT through WW resets the flip flops 605 and 606. That is to say that the binary coded keyboard selection at terminals TT through WW is inverted, digit by digit at gates 611 through 614, respectively. The signals as inverted are coupled to gates 615, 617, 619, and 621, and the digits in their non-inverted state to terminals 616, 618, 620, and 622. Without a KBE signal at terminal SS-8, all gates 615 through 622 are disabled, and with the presence of an execute command at terminal SS-8, the digits at input terminals TT through WW operate the RS flip flops 605 and 606 during their duration, and switch the flip flops 605 and 606 back thereafter in conventional set-reset fashion. Under control of the processing circuitry of FIGS. 7 and 8, the corresponding row of the memory elements 601 through 604 is scanned, and the information is read out at terminals Y, Z, AA, and BB.

Figure 7:
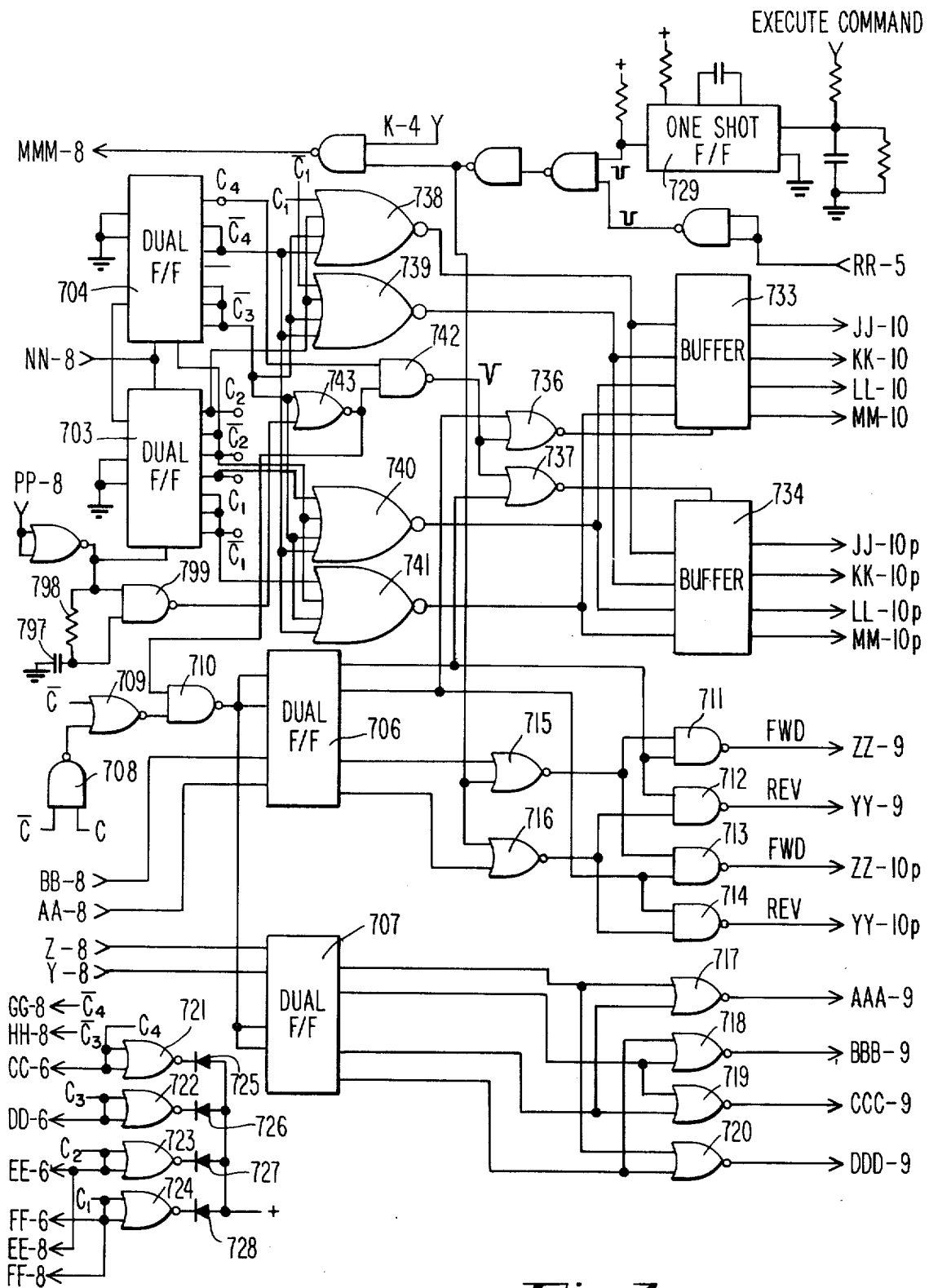
FIGS. 7 and 8 show in detailed logic form a processor control for the embodiment of FIG. 2.
Figure 8:
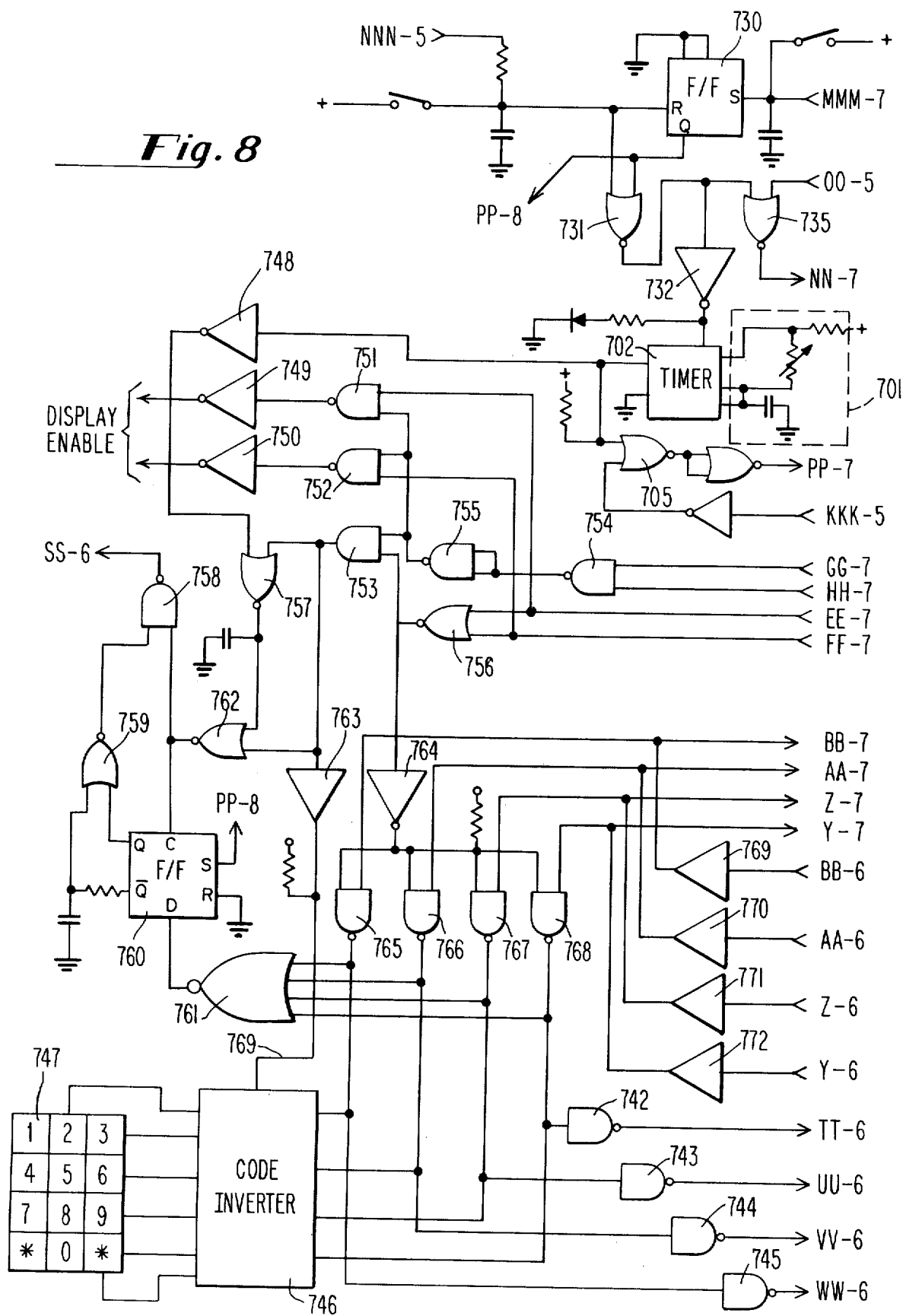

FIGS. 7 and 8 together form the basis for a process controller by regulating interaction of the memory, the keyboard, the servomechanism, and the information each must receive and process in conjunction with the decoder. FIGS. 7 and 8 shall be discussed together as though they were a single figure, with consistent numbering in both, the interconnections between the two being clearly shown.

The scanning of the FIG. 6 memory and therefore the read in and read out of data therefrom was shown to be conducted under control of an incrementing 4 bit binary number. The timing of the number in question is generated by an oscillator 701 operated by a timer (advantageously a commercially available 555 timer) at approximately 5KHz. Therefore, assuming NOR gate 705 is properly conditioned, the timer 702 increments a counter comprising two dual flip flops 703 and 704. The flip flops 703 and 704 are wired in well known fashion as a 4 bit binary counter, which therefore increments, when properly conditioned, through the 16 binary counting increments at a rate of 5000 counts per second. The flip flops 703 and 704 are indicated as having 8 outputs, representing each digit (i.e., $c_1$ through $c_4$), and the inverse of each digit (i.e., $\overline{c_1}$ through $\overline{c_4}$). Those digits are utilized, among other places, at terminals CC-6 through FF-6, in order to drive the random access memory chips 601 through 604 of FIG. 6.

Because of the rapid 5KHz counting rate of the flip flops 703 and 704, the reflexes of the user could not possibly require the servo to begin to operate before the memory has begun to run through at least one cycle. When the memory is being scanned at the rapid rate, a given row of the memory is accessed approximately 300 times per second, and this information is continually being presented to the servo (although not necessarily energized to have any effect therein). It will be recalled that the location number 6, or the seventh word in a given row of the memory, controls the servo by identifying the videotape recorder to be used, the foward or reverse direction of the given segment, and the proportionality constant for that location of tape.

A pair of dual flip flops 706 and 707 insures that proper control of the servomechanism will occur based on the proper code word from location number 6. The first two bits A and B of the word from the memory are coupled via terminals AA and BB to flip flop 706, and the second two digits C and D are coupled to the other flip flop 707. Gates 708 through 710 operate in response to bits $\overline{c_1}$, $c_2$, $c_3$, and $\overline{c_4}$ as shown, together with a 50 microsecond pulse generated at capacitor 797, resistor 798, and NAND gate 799 via PP-8, to identify the binary number 6, thereby signifying location No. 6 in the associated row of the memory. In accordance with a preferred code embodiment, the first bit A determines the videotape recorder selection, and thereby energizes either the first or second of the dual flip flop 706. The second bit B of the word represents the direction, forward or reverse, and in conjunction with flip flop 706 energizes and associated one of gates 711 through 714. Those gates, which are also dependent on receipt of an execute command via gates 715 and 716, control the VTR as follows: gate 711 energizes VTR1 in the forward direction; gate 712 energizes VTR1 in the reverse direction; gate 713 energizes VRT2 in the forward direction; or gate 714 energizes VTR2 in the reverse direction.

Dual flip flop 707, which is responsive to the last two digits CD of the code word via terminals Y6 and Z6, affords the function of indicating which of several proportionality constants are to be used. That is, as was set forth hereinbefore, different deceleration properties may occur at different points on the given tape (i.e., the middle of the tape, and the almost wound and almost unwound portions of the tape). Thus, it may be useful to have at least three different proportionality constants for the servomechanism to utilize in the comparison operation. Bits Y and Z of the seventh word (i.e., word No. 6) in the memory allow for identification of four different constants, depending on where the segment to be played will be located on the tape. Those bits cause dual flip flop 707 to energize one of gates 717 through 720, which via connections AAA through DDD indicate to the servomechanism which proportionality constant is to be utilized.

For purposes of display of the current outputs of counter 703 and 704, light emitting diodes 725 through 728 through gates 721 through 724 respectively provide an opportunity for the user or the technician to monitor the state of the counters $c_4$ through $c_1$. (A similar function is provided by diodes 637 through 640 of FIG. 6).

Also in FIG. 7, the execute command is received directly from the execute button or switch, and triggers a one shot 729 to produce a "clean" output of known duration on each pressing of the button. The one shot 729 advantageously provides a signal of 200 millisecond duration which in conjunction with the set index command from the decoder via terminal RR-5, provides plural functions. First, as set forth hereinbefore, the VTR identification and direction selections are enabled via gates 715 and 716. Secondly, in conjunction with an initiate command which also energizes a video on condition in FIG. 5, a signal is provided to inhibit operation of the timer 702. That is, the gated signal from the one shot 729 sets a flip flop 730 which through NOR gate 731 and an inverter 732 inhibits the timer 702, and thereby stops incrementing the count at flip flops 703 and 704. The flip flop 730 is reset by a start scan at terminal NNN from the decoder of FIG. 5. The setting of the output of gate 731 by flip flop 730 also provides an input to NOR gate 735, the output of which resets the flip flops 703 and 704 upon termination of the load ram signal via terminal 00-5 (the reset for flip flops 703 and 704 is a logical 0 during scanning or the load ram signal).

Hence, logic including the one shot 729, flip flop 730, and the timer 702, in conjunction with the flip flop counters 703 and 704, produce a binary number, the incrementing of which accesses the memory elements 601 through 604 and thereby enables loading or scanning of the memory. For read out, the execute command which enables selection of a given column of the memory stops the oscillator-timer 701 and 702. For writing data into the memory, SRC pulses, which accompany the numbers, advance the counter including dual flip flops 703 and 704.

An important function provided by the process controller of FIG. 7 is the coordination of the servomechanisms, which are used to advance the tape to rest stops, and to the next segment to be played, with the memory which includes data for controlling the servos. In FIG. 7, a pair of buffers 733 and 734 are responsive selectively, through the logic shown, to the output states of the dual flip flop counters 703 and 704, and to the VTR selection at the dual flip flop 706. It will be recalled from the foregoing discussions that the data in storage in the memory is conveyed to the servo in order to determine the present location of the tape and the differential between that location and the position for the next segment. It is the function of the buffers 733 and 734 to provide preset enable signals for appropriate circuitry in the servomechanism, which is described in detail hereinafter, whereby the bits which are being coupled out from the memory will be read properly into memory type elements in the servomechanism. More particularly, buffer 733 provides control signals for the servomechanism which is associated with VTR1, and buffer 734 provides preset enable signals for the portion of the servomechanism associated with VTR2. Hence, under control of NOR gates 736 and 737, the selection of VTR at dual flip flop 706 also enables one or the other of buffers 733 and 734. Thereby, the digit storing elements in the respective servos corresponding to each VTR may maintain different data in storage simultaneously. It will also be recalled that the specific data which is provided from the memory to the servo concerning subsequent tape segment locations are stored at locations 12 through 15, inclusive in the memory, with location number 12 (i.e., the 13th stored number) corresponding to the thousands place, location 13 to the hundreds place, location 14 to the tens place, and location 15 to the units place. The buffers 733 and 734 have outputs JJ associated with the thousands place, on through MM associated with the units place, sequentially. The buffers 733 and 734 have a select one of these outputs energized in response to NOR gates 738 through 741, which respectively identify the binary numbers 12 through 15, from dual flip flop counters 703 and 704, and thereby actuate an associated output JJ through MM of buffers 733 and 734 whenever a strobe signal is delivered from NOR gates 736 or 737. In particular, NOR gates 736 and 737 in combination with a NAND gate 742 and another NOR gate 743, enabled by a one shot 797, 798, and 799 via PP-7, temporarily energizes buffers 733 or 734 and couples the associated input signal from one of gates 738 through 741 to the servo via outputs JJ through MM, as appropriate.

The balance of the process control circuitry, which is located on FIG. 8, is dedicated largely to handling data to and from the keyboard, and merging that data with other information being processed to and from the memory. As set forth hereinbefore, preferred embodiments utilize a standard telephone type keyboard including 12 buttons arrayed in three columns and four rows. Conventionally also, the digit selection occurs by pressing a button, which energizes a unique intersection of row-column combinations, and which is represented as a 6 bit binary code. For present purposes, only 4 bits are utilized, which are to be coupled to the memory at terminals TT through WW, in order to energize the accessing of data from the memory chips. Accordingly, the keyboard 747 with its associated conventional internal coding logic is merely shown symbolically, with four output lines from a code converter, as desired, being designated ABCD, in correspondence with the four digits in question, and also with the 16 possible alternatives to be presented to the user. It is to be understood that if more options are desired, obvious alterations of the coding schemes will be utilized. In any event, it is a simple matter for the 6 output bits of the keyboard 747 to be converted selectively into the desired 4 bit code representing ABCD, which digits are respectively coupled to the inputs of gates 742 through 745, and thence via terminals TT through WW to the memory. The code converter 746 is shown with an inhibit terminal 769, whereby during the appropriate times, no data may be coupled from the keyboard to actuate the apparatus. (e.g., during times of play of a tape, when data is being read into the memory via the cue track). Accordingly, the control terminal 769 of the code converter 746, which as seen is related to the keyboard execute command which correspondingly regulates the memory, effectively strobes decoded digits from converter 746 into the memory at appropriate times. As will be appreciated upon close inspection of the logic of FIG. 8, this strobing is designed to occur whenever an option is being presented to the user, and at the initiation of the timing cycle. The output of the dual flip flop counters 703 and 704 is coupled to gates 751, 752, 754, and 756 via terminals EE through GG. The output of the timer 702 is available directly through inverter 748, and the output bits from the memory elements 601 through 604 are available at buffers 769 through 772. Thus, the logic of FIG. 8 receives signals, and is configured in order to operate in response to those signals to make keyboard data available at appropriate times. Furthermore, via output terminal SS-6, the keyboard enable signal is produced which latches the keyboard data into the memory of FIG. 6. At inverter 749 and 750, further energizing signals are produced which, in conjunction with data from the keyboard, are utilized to present the option numbers selected at the keyboard at an appropriate display.

In partial summary, the process controller shown in FIGS. 7 and 8 operates in conjunction with the memory, servomechanisms, keyboard, and decoder in order properly to insure the storage of data for subsequent option selections, accomplishment of the selection via the keyboard and execute switch, read out of the data from the keyboard to the servomechanism, and preset enablement of the servomechanism in order properly to receive the data from the memory. FIGS. 9, 10, and 11 show a preferred embodiment for a servomechanism in accordance with the principles of the present invention. It is to be understood that FIGS. 9, 10, and 11 show apparatus for a single VTR. In practice, the circuitry of FIGS. 9 through 11 is duplicated for each machine. Specifically, FIG. 9 shows a portion of the servomechanism designated a "$v^2$ generator", which accomplishes the tasks generally set forth hereinbefore of developing the instantaneous speed signal $s$ which represents instantaneous velocity squared multiplied by the appropriate deceleration constant. FIG. 10 shows apparatus which evaluates the distance to go, compares it with the instantaneous speed signal $s$ from FIG. 9, and produces a signal for controlling the series resistance in the drive motors of the corresponding VTR. FIG. 11 shows a preferred circuit, one of which is utilized for each VTR, for actually accomplishing the speed and deceleration variation of the corresponding motor. It is to be noted that due to the duplication of the FIGS. 9, 10, and 11 apparatus, control signals useful therefor sometimes occur doubly within the foregoing described circuits. In each case, the duplication is indicated with a $p$ following the interconnection. Hence, in FIG. 7, buffer 733 has output terminals JJ-10 through MM-10, while buffers 734 have output terminals JJ-10$p$ through MM-10$p$. Although the functions of each are identical, each is coupled to a different FIG. 10 apparatus, and thereby effectuates action in the appropriate corresponding videotape recorder.

Referring first to FIG. 9, there is shown a circuit which is largely analog in function, and which produces a pulse, the timing of which generates the value of the speed signal $s$.

In FIG. 10, data from the cue track of the associated recorder is coupled to a phase locked loop 901. The phase locked loop 901 is conventionally embodied identically to the loops described hereinbefore in the receiver of FIG. 4, except that no frequency divider is provided in the loop. Accordingly, the phase locked loop 901 is operating at the rate of the 300Hz signal on the tape cue track multiplied by the present playing speed of the machine (i.e., the rate at which the 300Hz self-clocking code passes the tape head). Hence, the phase locked loop in its normal operation produces a voltage, an analog control voltage to drive its local voltage controlled oscillator, which is directly proportional to the instantaneous tape speed. That voltage in turn operates a type of ramp generator 902, which advantageously is embodied as an integrated circuit commercially available from RCA and designated a "CA3099" chip. The output signal of the local VCO is designated a "data clock", and is coupled to counters in FIG. 10, as set forth hereinafter. The 3099 integrated circuit 902 provides capability for a number of varied operations, one of which is production of a ramp generator. More specifically, the generator 902 produces a steadily increasing charging of a capacitor commencing upon each receipt of a signal at FFF; the capacitor is discharged whenever the ramp voltage reaches a certain level. In FIG. 9, that level is the voltage from the phase locked loop 909, which is directly proportional to the instantaneous velocity. Hence, the duration of each ramp from generator 902 is representative of the instantaneous tape velocity.

The ramp produced by the generator 902 is coupled to an integrator, which produces a representation of the speed signal $s$. The integrator advantageously is embodied as a capacitor 908 and an integrated circuit 903 availabe from RCA under the trade designation "CA3084", which like the generator chip 902 also provides facility for numerous alternative operations. As set forth in FIG. 9, the integrator 903 and 908 produces the required output based on the proposition that the slope of the ramps from generator 902 is constant, with each ramp commencing upon receipt of a trigger signal at terminal FFF. That is, the integrator produces a ramp, which is terminated by 902 by changing capacitor 908 when the voltage at capacitor 908 is the same as the input volage to 902. Further, the ramp terminates when the voltage has reached a value proportional to the speed. Thus, integrator 903 produces a square wave which is low during the time that the ramp is charging and high during other times. Moreover, it goes from high to low at the time of a trigger signal at terminal FFF, and goes back to high under control of the ramp duration, so that the duration of each complete cycle of the integrator 903 and 908 is proportional to the reciprocal of the tape velocity, and the ratio of the duration of the high periods of the cycle to that of the low periods is the ratio of the reciprocal of velocity to velocity, which is the reciprocal of $v^2$. Further, under control of the process controller at terminals AAA through DDD, a respective one of four potentiometers 904 through 907 is coupled to the integrator 903 and 908. In accordance with the discussion set forth hereinbefore, each of the potentiometers 904 through 907 presents a different constant (i.e., ½$a$), representing the deceleration properties of the machine depending upon the location of the segment in question at the beginning, middle, or end of the tape. In turn, this biasing of the $1/v^2$ signal produced by the integrator 903 and 908 corresponds to production of the speed signal $s = v^2/2a$. The scaled output of the integrator 903 and 908 is coupled at terminal EEE to FIG. 10 for further processing in accordance with the servomechanism operation described generally hereinbefore and with particular reference to FIG. 10 hereinafter.

Referring next to FIG. 10, the scaled speed signal $s$ from terminal EEE, also hereinafter referred to as the $v^2$ clock, is inverted at 909 and coupled via NOR gate 910 to the clock input 943 of a first one of a dual D-flip flop 911. This first one of the flip flops 911 has respective Q and $\overline{Q}$ outputs 941 and 940, a D input 939 and a direct set (i.e., to Q = 1, $\overline{Q}$ = 0) input 942. The outputs of that flip flop of 911 provide signals whereby the decoder of FIG. 5 places the machine in the stop mode, and whereby the apparatus of FIG. 11 controls deceleration by varying the VTR motor resistance.

For purposes of comparison of the speed signal s with the distance $d$, a digital version of the instantaneous speed signal $s$ is maintained in three counters 912, 913, and 914. In a preferred embodiment, counter 913 and 914 each divide by a hundred, and counter 912 by three. The counters 912, 913, and 914 are connected sequentially, so that the output of the third counter is a division by 300, which, through a 20 microsecond one shot of gates 922, 923, 924 and a capacitor 943, produces the trigger signal at FFF-9 for the ramp generator 902 of FIG. 9. The output of gate 924 also clears the divide by three counter 912. Counters 913 and 914 are strobed by pulses from the phase locked loop 901 of FIG. 9 via terminal GGG, and are cleared to zero by receipt of a logical 1 from NOR gate 927 as discussed hereinafter.

The distance to go is developed at a decimal down counter including four bit binary counters 915, 916, 917 and 918. Each of the counters 915 through 918 is preset with a four bit binary number from the memory via terminals Y, Z, AA, and BB, and when clocked by NAND gate 935 sequentially counts down from the four place decimal number thereby represented. That is, counter 918 represents the decimal thousands place of the distance to go, counter 917 represents the decimal hundreds place of distance to go, counter 916 represents the tens place of the distance to go, and counter 915 represents the units place of distance to go. As the memory is scanned for read out, and particularly at locations number 12 through 15 inclusive, 4 bit binary words for each decimal represented by the counters 915 through 918 are sequentially presented. As set forth hereinbefore, preset enable signals are generated in FIG. 7, and are sequentially produced at terminals JJ, KK, LL, and MM. The production of a preset enable is thereby coordinated with the receipt of the corresponding word from the memory, and the down counters 915 through 918 are thereby properly set with the distance to go before the associated videotape recorder is to begin advancing to the segment indicated.

In accordance with the servomechanism control method employed, the distance to go $d$ (represented by the instantaneous count in counters 915 through 918) is to be compared with the speed signal $s$ (the instantaneous value of which is embodied in counters 912 through 914), and control of the videotape motors is to be based thereupon. In accordance with this scheme, comparators 919, 920, and 921 are provided for comparison of respective states of counters 915 through 917 with those of counters 914 through 912. No comparison is necessary for the state of the thousands place down counter 918, since in accordance with the units utilized herein, the speed signal $s$ cannot exceed 300 units, and therefore no comparisons will be effective for control until the thousands down counter 918 reaches 0. To this end, gates 936 and 937 sense the state of counter 918 during the counting process, and provide two of three inputs for a NAND gate 938. The other input of gate 938 is the output of the last comparator 921, such that when all three comparators show equality, the D input 942 of the above referenced first flip flop of 911 is energized.

In a preferred embodiment, the comparators 919 through 921 are embodied as CMOS logic chips commercially available under the designation "74C84", and are each 4 bit binary comparators which may be cascaded as shown. The comparators 919 through 921 operate continuously, and produce an instantaneous value changing at a high rate depending on the value of the compared input quantities. The output from comparator 921 is a logical 1 so long as the speed signal $s$ (the output of counters 912 through 914) is smaller than the distance to go $d$ (the output of counters 915 through 917). Whenever the distance to go is less than the speed signal $s$, the logical condition of comparators 919 through 921 are met, and the output of comparator 921 to NAND gate 938 becomes a logical 1. Since NOR gates 936 and 937 are also satisfied, dual flip flop 911 is thereby energized at the time of the positive slope at EEE-9, and via terminal XX-11 and the corresponding circuit of FIG. 11, the videotape recorder is put into the stop mode. Additionally, via NOR gate 934, transistor 945, and capacitor 944, which act as a one shot, a servo stop initiate command is produced at terminal 536-5 and is coupled back to terminals 535 or 536, as appropriate, in FIG. 5, thereby activating the one shot flip flops 539 and 540, which initiates stopping of the machine.

As set forth above, the dual flip flop 911 has a first flip flop clocked at 943 and producing output signals at 940 and 941. The second of the flip flops of 911 has its clock input at 945, its direct set at 946, and its $\overline{Q}$ at 944. The clock and set terminals 945 and 946 are interconnected with a resistor 947, and the set terminal 946 is connected to ground through a capacitor 948. The output of the second divide by 100 counter 913 is coupled not only to the divide by three counter 912, but also to the clock input 945 of the second flip flop 911. Thus, each count from counter 913 not only pulses the clock terminal 945, but also charges the capacitor 948. Since the D input of that second flip flop is connected to ground, the positive transition at 945 shifts the $\overline{Q}$ terminal 944 to a logical 1, and the capacitor 948 begins charging. Whenever, during a time period set by the RC combination 947 and 948, the capacitor becomes charged to a certain level, the set terminal 946 of the flip flop is energized, and the Q terminal 944 returns to a logical 0. Thus the data clocking from counters 914 and 913 provide pulse signals at 944 for clocking the down counters 915 through 918, which pulses are terminated by virtue of the RC combination 947 and 948.

The direct set terminal for the first mentioned flip flop of 911 is operated by logic gates 925 through 929, which in turn are controlled as follows. NAND gates 926 and 928 each are coupled to terminals ZZ and YY, which in FIG. 7 are designated as the forward or reverse direction selection for the VTR to operate. In particular, connection YY is the reverse direction initiator, and ZZ is the forward direction initiator. The forward initiator, through gates 926, 925, and 927 provides one method for de-energizing the direct set input 939, and the reverse may do so through gates 928, 929, and 927 in conjunction with a signal designated $\overline{EOD}$, which comes directly from the videotape recorder, and which is a logical 1 as long as the VTR is in motion. Whenever the VTR actually comes to a stop (i.e., when distance equals velocity equals 0, the $\overline{EOD}$ signal becomes a logical 0, which automatically terminates the logical 0 condition at direct set terminal 939 which was produced by the forward or reverse control signals at YY and ZZ. The output of gate 927 which energizes the direct set terminal 939 also provides a "clear" input signal for the divide by one hundred counters 913 and 914, and provides a control at NOR gate 910 for blocking the $v^2$ clock signal from the clock input 943 of the first flip flop of dual flip flop 911.

The $\overline{EOD}$ signal as well as the output of gate 927 is coupled to a NOR gate 931, and also to a flip flop comprising NOR gates 932 and 933, thereby providing one input for a NAND gate 930. The other input to the NAND gate 930 is the play inhibit signal to FIG. 9. Thus, the output of NAND gate 930 provides the previously described control signal for terminals PPP-9 of FIG. 9.

In partial summary, the apparatus of FIGS. 9 and 10 thus-far described provides for production of the distance to go and instantaneous speed signals, the comparison thereof, and the production of an "on-off" signal at terminal XX whereby control of the series resistance in the VTR motors actually is achieved. Other logic in FIG. 10 provides control procedures as previously described regarding actual stopping of the machine.

FIG. 11 sets forth an analog circuit which functions under control of the VTR stop mode signal at terminal XX actually to vary the series resistance of the VTR motor. Rather than direct resistance switching, however, FIG. 11 employs a linear circuit which modulates current through a fixed resistor, whereby the apparent resistance presented to the motors are altered. Transitions at the Q output 941 of the first flip flop of dual flip flop 911 produce a signal at terminal XX-10 which is coupled to an integrator comprising an amplifier 1101, capacitor 1102, transistors 1103 and 1104, and associated biasing circuitry as shown. Hence, for as long as a logical 1 (i.e., a positive voltage) is presented at terminal XX, the output voltage of the integrator increases, and correspondingly, the integrator output decreases whenever a logical 0 is presented at terminal XX. The output of the integrator is coupled to an amplifier 1106 which drives a darlington power transistor 1105, which varies current in such a way that it effectively acts as a resistor, with the transistors thereof being turned on in varying degrees to change the effective amplitude of the resistance. In FIG. 11, the amplifiers 1101 and 1106 are advantageously embodied as operational amplifiers of common variety, such as those available on a dual operational amplifier integrated circuit commercially available under the designation "5558V".

In order to utilize the circuitry of FIG. 11 to control recorders such as the IVC machines described hereinbefore, the resistance known as R4 which is actually connected in series with the motors is removed, and substituted therefor is a resistor of approximately an order of magnitude larger resistance. That resistance is coupled to the terminals shown in FIG. 11 as "to VTR motor", which in turn is connected to the secondary windings of a transformer 1107. The primary windings of the transformer 1107 are coupled to a full wave bridge rectifier 1108, which is connected across the darlington 1105 and resistor 1109.

A function as yet undescribed in FIG. 9 also relates to control of the VTR. That is, it is advantageous to couple VTR control signals to relays rather than directly, and such connections are accomplished at the transistors 970 through 973. In particular, transistor 970 has its base driven by the forward direction selection from FIG. 7, and its collector 977 connected to the forward drive relay in its corresponding machine. Transistor 971 has its base energized by a reverse direction selection in FIG. 7, and its collector 978 drives the reverse selection relay in its corresponding videotape recorder. Transistor 972 has its base energized by a play signal from terminal PPP of FIG. 10, and its collector 979 drives the play initiate relay for its corresponding machine. Finally, transistor 973 has its base energized by stop signals from terminals R and S of FIG. 5, and its collector 980 accordingly drives the stop relay for the machine. The play signal at PPP and the stop signal at terminals R and S are coupled to a flip flop comprising gates 974 and 975, which in turn drives a NAND gate 976 and which is also cross coupled with the similar device in the other servomechanism FIG. 9 apparauts. The cross coupling insures that only one UART (of FIG. 4) will be operative at a time, and the connection from NAND gate 976 back to terminal M of FIG. 4 enables the UART circuits to function.

The foregoing description is presented at a level of disclosure which is believed adequate for persons of ordinary skill in the relevant arts to make in use preferred embodiments of the present invention. It is to be further understood that while the apparatus disclosed constitutes a preferred embodiment of the principles of the present invention, numerous alternative embodiments will also occur to those of ordinary skill in the art, particularly as technology unfolds, which are well within the spirit and scope of the principles of the present invention. For example, it is impossible to determine the number and types of memory devices which will hereafter be developed and which will be suitable for storage of the video segments instead of the videotape recorders set forth herein. Nevertheless, it is anticipated that many such systems will fall within the scope of the present invention. Likewise, the servomechanism scheme set forth may be applied advantageously to a large variety of systems totally unrelated to the interactive display system set forth herein.

APPENDIX I

DATA FORMAT

| A B C D | E = 1 | E = 0 |
|---|---|---|
| 0 0 0 0 | 0 | No operation |
| 1 0 0 0 | 1 | Paper advance (printer) gives 1 blank space |
| 0 1 0 0 | 2 | Video on (video of VTR in play to Monitor) |
| 1 1 0 0 | 3 | Clear-permits numbers to go to data register |
| 0 0 1 0 | 4 | Print-prints 1 line |
| 1 0 1 0 | 5 | Slide-actuates rasp |
| 0 1 1 0 | 6 | Latch enable-preceeds certain commands$_{(1)}$ |
| 1 1 1 0 | 7 | S.I. (set index) selects portion of memory |
| 0 0 0 1 | 8 | L.R. (load ram) permits numbers to be loaded in ram |
| 1 0 0 1 | 9 | $\overline{LR}$ ends loading data into memory section |
| 0 1 0 1 | A$_{(a)}$ | Stop-stop signal to VTR which is in play |
| 1 1 0 1 | b | X.N. (execute enable) to permit VTR to go to rest position |
| 0 0 1 1 | c | Initiate-at least 3 proceed other data |
| 1 0 1 1 | d | No instruction (not used) |
| 0 1 1 1 | e | No instruction (not used) |
| 1 1 1 1 | f | No instruction (not used) |

APPENDIX II

MEMORY FORMAT - EACH COLUMN

| CODE | LOC. NO. | COMMAND |
|---|---|---|
| 0110-0 | * | Latch enable (LE) Always use this code |
| 1110-0 | * | Set Index (SI) Always use this code |
| XXXX-1 | * | Index |
| 0110-0 | * | Latch enable (LE) Always use this code |
| 0001-0 | * | Load RAM (LR) Always use this code |
| 0000-1 | 0 | 1st number-Does not show-Always use this code |
| XXXX-1 | 1 | Most significant digit (left) |
| XXXX-1 | 2 | Middle digit Display Slide number (previous) |
| XXX-1 | 3 | Least significant digit (right) Selection (same as index) |
| 1111-1 | 4 | (for last column in section with no rest position, LR can be here) |
| 1111-1 | 5 | Always use this number - non functional |
| XXXX-1 | 6 | Winding direction and v$^1$ constant (see servo) |
| 1111-1 | 7 | Always use this number |
| 1111-1 | 8 | Always use this number |
| 1111-1 | 9 | Always use this number |
| 1111-1 | 10 | Always use this number |
| 1111-1 | 11 | Always use this number |

APPENDIX II-continued

MEMORY FORMAT - EACH COLUMN

| CODE | LOC. NO. | COMMAND |
|---|---|---|
| XXXX-1 | 12 | THOUSANDS |
| XXXX-1 | 13 | Winding distance-always 4 digits. HUNDREDS |
| XXXX-1 | 14 | TENS |
| XXXX-1 | 15 | UNITS |
| 1001-0 | * | $\overline{LR}$ Ends loading of this column of memory. Always use this number. |

*Commands and Index No. which are encoded on cue track in this order, but not actually stored on memory. Locations 0 through 15 are those referred to in the specification.

APPENDIX III

PRINTER

| | |
|---|---|
| I | Printer prints 7 columns, with 2 right columns serving as the random access slide projector (rasp) slide code. |
| II | Each set of data to be printed must be preceeded by a "clear" (1100-0) and a "number" C (0011-1). At least 7 numbers, with E bit = 1 must follow. |
| III | Format: (order of recording top to bottom) 1100-0 Clear proceeds data 0011-1 C (binary No. 12) |
| (right Col. No. 1) | XXXX-1 Rasp code, XXXX-1 of next slide to be seen XXXX-1 Slide number, as determined by test format. XXXX-1 |
| (blank Col. No. 5) | — Nothing printed in 5th column. XXXX-1 |
| (left Col. No. 8) | XXXX-1 Video segment carrying data (segment XXXX-1 chosen from previous slide) |
| | — Nothing printed in left hand (9th column) 0010-0 Print - Actuates printer 1010-0 Slide actuation |

I claim:
1. An interactive audiovisual display system comprising:
videotape means for storing a plurality of video segments, randomly accessible for display, each segment being identified with a code corresponding to the position of the segment on a tape relative to a predetermined datum position on said tape;
means for displaying to the user a plurality of options corresponding respectively to select ones of said segments;
user selection means for designating a preferred option from said plurality of options presently displayed;
a source of coded control signals, said singals including frames of data associated respectively with the options presented the user by said means for displaying, each frame including the identification of the location of a select segment to be next executed at said videotape means in response to user selection of the option associated with said each frame; and
control means responsive to said user selection means and to said source of coded signals, said control means being responsive to the location identification from the frame associated with the preferred option, for controlling said videotape means to advance the tape from its present location to said location identification, said control means including means for monitoring the instantaneous speed and location of the tape while advancing, and means for varying the acceleration rate of the tape in response to the relative magnitudes of the instantaneous tape speed and the distance to go to said location identification.

2. A system as described in claim 1 wherein said means for monitoring includes means for developing a speed signal (s) proportional to the square of instantaneous tape speed;
   means for evaluating the tape distance to go between the instantaneous tape location and said location identification;
   means for comparing said distance to go (d) with said speed signal (s); and wherein said means for varying includes
   means for selectively varying the acceleration rate of said videotape means in response to said means for comparing.

3. Apparatus as described in claim 2 wherein said means for selectively varying comprises:
   means for advancing the tape toward the identified location while said distance to go is greater than said speed signal;
   means for commencing deceleration of said tape when said distance to go and said speed signal are equal, and for thereafter varying the deceleration rate, in a sense which satisfies the equation $d = k v^2$, where $k$ is a proportionality constant and $v$ is the instantaneous tape speed, until the identified location is reached.

4. Apparatus as described in claim 3 wherein said means for commencing includes means for developing said constant, $k$, in accordance with the deceleration properties of the tape winding motors in said videotape means, and wherein said means for varying comprises variable resistance means in series with said motors.

5. Apparatus as described in claim 1 wherein said source of coded signals comprises:
   temporary storage means for storing the frames of data associated with a given plurality of options while said given plurality is being displayed to the user;
   primary storage means for storing data including all frames of data corresponding to each option to be presented; and
   input means for sampling said primary storage means and coupling a select plurality of frames from said primary storage means to said temporary storage means immediately proir to display of corresponding options to the user.

6. Apparatus as described in claim 5 wherein said primary storage means comprises a track of the tape from said videotape means, the frames to be coupled prior to a given option being coupled by said input means to said temporary storage means during play of a priorly selected segment of said videotape means.

7. Apparatus as described in claim 5 wherein said videotape means comprises a plurality of videotape players, and wherein each frame of data includes the identification of the player upon which the associated segment is located.

8. Apparatus as described in claim 6 wherein said means for displaying includes a random access slide projector, and wherein said primary storage means stores further data including the identification of a given slide depicting options next to be displayed to the user after play of an associated segment.

9. In a reel to reel tape apparatus having torque motors applying torque of opposite directions to each reel, the portion of tape presently located at the tape head being designated the present tape location, apparatus for advancing the tape to rest precisely at a given location comprising:
   means for actuating said motors to advance the tape toward said given location at maximum acceleration;
   means, responsive to the tape reels and to said means for actuating for continuously evaluating the instantaneous speed of the tape and the distance to go (d) to said given location;
   means, responsive to said means for evaluating, for developing a signal (s) which is proportional to the square of the instantaneous speed;
   means, responsive to said means for evaluating and to said means for developing, for comparing said signal (s) with said distance to go (d); and
   means, responsive to said means for comparing, for selectively varying the acceleration rate of said tape in response to the comparison.

10. Apparatus as described in claim 9 wherein said means for selectively varying comprises:
    means for advancing the tape toward said given location at maximum acceleration while said distance to go (d) is greater than said speed signal (s); and
    means for commencing deceleration of said tape when said distance $d$ and said signal $s$ are equal, and for thereafter varying the deceleration rate in a sense which tends to satisfy the relation $d = s = k v^2$, where $k$ is a proportionality constant and $v$ is the instantaneous tape speed, until said given location rate is reached at zero speed.

11. Apparatus as described in claim 10 wherein said means for commencing includes means for developing said constant, $K = \frac{1}{2}a$, where $a$ is the deceleration rate of the motors for the present tape location.

12. Apparatus as described in claim 11 wherein said means for varying comprises variable resistance means in series with said motors.

13. An interactive audiovisual display method comprising the steps of:
    providing videotape means for storing a plurality of video segments, randomly accessible for display, each segment being identified with a code corresponding to the position of the segment on a tape relative to a predetermined datum position on said tape;
    displaying to the user a plurality of options corresponding respectively to select ones of said segments;
    providing coded control signals, said signals including frames of data associated respectively with the options presented the user by said means for displaying, each frame including the identification of the location of a select segment at said videotape means corresponding to the option associated with the frame;
    identifying a given frame in response to selection of an associated preferred option by the user; and
    accessing a select one of the segments in storage by advancing said videotape means to the given tape location designated in said given frame, in response to the present location of the tape and to the location identification from the frame associated with the preferred option, said accessing step including monitoring the instantaneous speed and location of the tape while it is advancing, and varying the acceleration rate of the advancing tape in proportion to the relative magnitudes of the square of the instantaneous speed and the distance yet to go to said location identification.

14. A method as described in claim 13 wherein said accessing step includes the steps of:
- evaluating the tape length between the instantaneous tape location and said given location;
- comparing said length ($d$) with said speed signal ($s$); and
- selectively varying the acceleration rate of said videotape means based on the comparison.

15. A method as described in claim 14 wherein said step of selectively varying includes the steps of:
- advancing the tape toward the identified location while said length is greater than said speed signal;
- commencing deceleration of said tape when said length and said speed signal are equal, and thereafter varying the deceleration rate, in a sense which satisfies the equation $d = k v^2$, where $k$ is a proportionality constant and $v$ is the instantaneous tape speed, until the identified location is reached.

16. A method as described in claim 15 wherein said commencing step includes developing said constant, $k$, in accordance with the deceleration properties of the tape winding motors in said videotape means, and wherein said varying step comprises variable resistance means in series with said motors.

17. A method as described in claim 13 wherein said step of providing coded signals comprises:
- providing temporary storage means for storing the frames of data associated with a given plurality of options while said given plurality is being displayed to the user;
- providing primary storage means for storing data including all frames of data corresponding to each option to be presented; and
- sampling said primary storage means and coupling a select plurality of frames from said primary storage means to said temporary storage means immediately prior to display of corresponding options to the user.

18. In a reel to reel tape apparatus having torque motors applying torque of opposite directions to each reel, the portion of tape presently located at the tape head being designated the present tape location, a method for advancing the tape to rest precisely at a given location comprising:
- actuating said motors to advance the tape toward said given location at maximum acceleration;
- continuously evaluating the instantaneous speed of the tape and the distance to go ($d$) to said given location;
- developing a signal ($s$) which is proportional to the square of the instantaneous speed;
- comparing said signal ($s$) with said distance to go ($d$); and
- selectively varying the acceleration rate of said tape in response to the comparison.

19. A method as described in claim 18 wherein said step of selectively varying comprises:
- advancing the tape toward said given location at maximum acceleration while said distance to go is greater than said speed signal; and
- commencing deceleration of said tape when said distance $d$ and said signal $s$ are equal, and thereafter varying the deceleration rate in a sense which tends to satisfy the relation $s = d = k v^2$, where $k$ is a proportionality constant and $v$ is the instantaneous tape speed, until said given location rate is reached at zero speed.

20. A method as described in claim 19 wherein said commencing step includes developing said constant, $k = \frac{1}{2}a$, where $a$ is the maximum deceleration rate of the motors for the present tape location.

21. A method as described in claim 20 wherein said varying step comprises providing a variable resistance in series with said motors.

* * * * *

UNITED STATES PATENT OFFICE
CERTIFICATE OF CORRECTION

Patent No. 4,032,897  Dated June 28, 1977

Inventor(s) Charles K. Pooley

It is certified that error appears in the above-identified patent and that said Letters Patent are hereby corrected as shown below:

Column 2, line 62, "conrolling" should be --controlling--;
Column 3, line 42, after "115" delete --whereby each step of the process 118 to a shift register 115--;
Column 5, line 12, "locigal" should be --logical--;
Column 5, line 49, "he" should be --the--;
Column 6, line 59, "pulse" should be --phase--;
Column 10, line 18-19, "thermal" should be --terminal--;
Column 10, line 20, "datal" should be --data--;
Column 10, line 46, "date" should be --data--;
Column 12, line 23, "1" should be --12--;
Column 12, line 31, "slot" should be --shot--;
Column 12, line 47, "ouput" should be --output--;
Column 13, line 25, after "video" insert --stop--;
Column 13, line 32, "slot" should be --shot--;
Column 13, line 40, after "537" insert --and 538--;
Column 21, line 10, "availabe" should be --available--;
Column 25, line 4, "apparauts" should be --apparatus--;
Column 25, line 63, in Appendix II, "LR" should be --LR--;
Column 27, line 24 and 25, "k" first and second occurrence, should be --K--;
Column 28, line 27 and 28, "k" first and second occurrence, should be --K--;
Column 29, line 19, "k" first and second occurrence, should be --K--;
Column 30, line 28, "k" first and second occurrence, should be --K--;
Column 30, line 33, "k" should be --K--.

Signed and Sealed this

Eighth Day of November 1977

[SEAL]

Attest:

RUTH C. MASON
Attesting Officer

LUTRELLE F. PARKER
Acting Commissioner of Patents and Trademarks